United States Patent
Forstall et al.

(10) Patent No.: US 8,385,946 B2
(45) Date of Patent: Feb. 26, 2013

(54) DISFAVORED ROUTE PROGRESSIONS OR LOCATIONS

(75) Inventors: Scott Forstall, Mountain View, CA (US); Gregory N. Christie, San Jose, CA (US); Robert E. Borchers, Pleasanton, CA (US); Kevin Tiene, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 1009 days.

(21) Appl. No.: 12/020,168

(22) Filed: Jan. 25, 2008

(65) Prior Publication Data

US 2009/0005082 A1 Jan. 1, 2009

Related U.S. Application Data

(60) Provisional application No. 60/946,837, filed on Jun. 28, 2007.

(51) Int. Cl.
*H04W 24/00* (2009.01)
(52) U.S. Cl. ............... 455/456.6; 455/404.2; 455/456.1; 455/456.2; 455/456.3; 455/456.4; 455/456.5; 455/457; 340/994; 340/995.19; 340/995.21; 701/400; 701/410; 701/411; 701/413; 701/416; 701/417
(58) Field of Classification Search ............... 455/456.5, 455/404.2, 456.1, 456.2, 456.3, 456.4, 456.6, 455/457; 340/994, 995.19, 995.21; 701/400, 701/410, 411, 413, 416, 417
See application file for complete search history.

(56) References Cited

U.S. PATENT DOCUMENTS

| | | | |
|---|---|---|---|
| 4,644,351 A | 2/1987 | Zabarsky et al. |
| 4,903,212 A | 2/1990 | Yokouchi et al. |
| 5,031,104 A | 7/1991 | Ikeda et al. |
| 5,067,081 A | 11/1991 | Person |
| 5,182,555 A | 1/1993 | Sumner |
| 5,187,810 A | 2/1993 | Yoneyama et al. |
| 5,195,031 A | 3/1993 | Ordish |
| 5,243,652 A | 9/1993 | Teare |
| 5,295,064 A | 3/1994 | Malec et al. |
| 5,337,044 A | 8/1994 | Folger et al. |
| 5,371,678 A | 12/1994 | Nomura |
| 5,379,057 A | 1/1995 | Clough et al. |
| 5,406,490 A | 4/1995 | Braegas |
| 5,416,890 A | 5/1995 | Beretta |
| 5,469,362 A | 11/1995 | Hunt et al. |
| 5,519,760 A | 5/1996 | Borkowski et al. |
| 5,523,950 A | 6/1996 | Peterson |

(Continued)

FOREIGN PATENT DOCUMENTS

| | | |
|---|---|---|
| BR | 9904979 | 12/2000 |
| CA | 2163215 | 5/1994 |

(Continued)

OTHER PUBLICATIONS

"27 Countries in your pocket"; [online] [Retrieved on Sep. 29, 2005] Retrieved from the Internet <URL: http://www.mio-tech.be/en/printview/press-releases-2005-09-29.htm; 1 page.

(Continued)

*Primary Examiner* — Anthony Addy
*Assistant Examiner* — Amanuel Lebassi
(74) *Attorney, Agent, or Firm* — Fish & Richardson P.C.

(57) ABSTRACT

Adaptive route guidance can include analyzing route progressions associated with one or more routes based on multiple user preferences. The adaptive route guidance can provide one or more preferred routes based on the user preferences, which can be presented to a user for navigation purposes.

21 Claims, 7 Drawing Sheets

U.S. PATENT DOCUMENTS

| | | | |
|---|---|---|---|
| 5,537,460 A | 7/1996 | Holliday, Jr. et al. |
| 5,539,395 A | 7/1996 | Buss |
| 5,539,647 A | 7/1996 | Shibata et al. |
| 5,552,989 A | 9/1996 | Bertrand |
| 5,559,520 A | 9/1996 | Barzegar et al. |
| 5,570,412 A | 10/1996 | LeBlanc |
| 5,598,572 A | 1/1997 | Tanikoshi et al. |
| 5,628,050 A | 5/1997 | McGraw |
| 5,636,245 A | 6/1997 | Ernst |
| 5,642,303 A | 6/1997 | Small |
| 5,675,362 A | 10/1997 | Clough et al. |
| 5,684,859 A | 11/1997 | Chanroo et al. |
| 5,689,252 A | 11/1997 | Ayanoglu et al. |
| 5,689,431 A | 11/1997 | Rudow et al. |
| 5,717,392 A | 2/1998 | Eldridge |
| 5,732,074 A | 3/1998 | Spaur et al. |
| 5,742,666 A | 4/1998 | Alpert |
| 5,745,865 A | 4/1998 | Rostoker et al. |
| 5,758,049 A | 5/1998 | Johnson et al. |
| 5,760,773 A | 6/1998 | Berman et al. |
| 5,767,795 A | 6/1998 | Schaphorst |
| 5,793,630 A | 8/1998 | Theimer |
| 5,835,061 A | 11/1998 | Stewart |
| 5,845,227 A | 12/1998 | Peterson |
| 5,867,110 A | 2/1999 | Naito et al. |
| 5,870,686 A | 2/1999 | Monson |
| 5,872,526 A | 2/1999 | Tognazzini |
| 5,883,580 A | 3/1999 | Briancon |
| 5,893,898 A | 4/1999 | Tanimoto |
| 5,898,680 A | 4/1999 | Johnstone |
| 5,905,451 A | 5/1999 | Sakashita |
| 5,908,465 A | 6/1999 | Ito et al. |
| 5,910,799 A | 6/1999 | Carpenter |
| 5,933,100 A | 8/1999 | Golding |
| 5,938,721 A | 8/1999 | Dussell et al. |
| 5,946,618 A | 8/1999 | Agre et al. |
| 5,948,041 A | 9/1999 | Abo et al. |
| 5,948,061 A | 9/1999 | Merriman et al. |
| 5,959,577 A | 9/1999 | Fan |
| 5,969,678 A | 10/1999 | Stewart |
| 5,987,381 A | 11/1999 | Oshizawa |
| 6,014,090 A | 1/2000 | Rosen et al. |
| 6,026,375 A | 2/2000 | Hall et al. |
| 6,064,335 A | 5/2000 | Eschenbach |
| 6,069,570 A | 5/2000 | Herring |
| 6,073,013 A | 6/2000 | Agre et al. |
| 6,073,062 A | 6/2000 | Hoshino et al. |
| 6,085,148 A | 7/2000 | Jamison |
| 6,091,956 A | 7/2000 | Hollenberg |
| 6,091,957 A | 7/2000 | Larkins |
| 6,101,443 A | 8/2000 | Kato |
| 6,111,541 A | 8/2000 | Karmel |
| 6,115,754 A | 9/2000 | Landgren |
| 6,119,014 A | 9/2000 | Alperovich et al. |
| 6,122,520 A | 9/2000 | Want et al. |
| 6,134,548 A | 10/2000 | Gottsman et al. |
| 6,138,142 A | 10/2000 | Linsk |
| 6,151,309 A | 11/2000 | Busuioc et al. |
| 6,166,627 A | 12/2000 | Reeley |
| 6,185,427 B1 | 2/2001 | Krasner et al. |
| 6,195,609 B1 | 2/2001 | Pilley et al. |
| 6,199,014 B1 | 3/2001 | Walker |
| 6,199,045 B1 | 3/2001 | Giniger |
| 6,199,099 B1 | 3/2001 | Gershman et al. |
| 6,202,008 B1 | 3/2001 | Beckert et al. |
| 6,202,023 B1 | 3/2001 | Hancock et al. |
| 6,216,086 B1 | 4/2001 | Seymour et al. |
| 6,236,365 B1 | 5/2001 | LeBlanc et al. |
| 6,236,933 B1 | 5/2001 | Lang |
| 6,246,948 B1 | 6/2001 | Thakker |
| 6,252,544 B1 | 6/2001 | Hoffberg |
| 6,256,498 B1 | 7/2001 | Ludwig |
| 6,259,405 B1 | 7/2001 | Stewart et al. |
| 6,266,614 B1 | 7/2001 | Alumbaugh |
| 6,266,615 B1 | 7/2001 | Jin |
| 6,278,884 B1 | 8/2001 | Kim |
| 6,298,306 B1 | 10/2001 | Suarez et al. |
| 6,314,369 B1 | 11/2001 | Ito et al. |
| 6,314,406 B1 | 11/2001 | O'Hagan et al. |
| 6,321,158 B1 | 11/2001 | DeLorme et al. |
| 6,323,846 B1 | 11/2001 | Westerman et al. |
| 6,324,692 B1 | 11/2001 | Fiske |
| 6,326,918 B1 | 12/2001 | Stewart |
| 6,343,317 B1 | 1/2002 | Glorikian |
| 6,345,288 B1 | 2/2002 | Reed et al. |
| 6,353,398 B1 | 3/2002 | Amin et al. |
| 6,353,743 B1 | 3/2002 | Karmel |
| 6,353,837 B1 | 3/2002 | Blumenau |
| 6,356,761 B1 | 3/2002 | Huttunen |
| 6,370,629 B1 | 4/2002 | Hastings et al. |
| 6,377,886 B1 | 4/2002 | Gotou |
| 6,381,603 B1 | 4/2002 | Chan et al. |
| 6,401,032 B1 | 6/2002 | Jamison |
| 6,405,123 B1 | 6/2002 | Rennar et al. |
| 6,414,635 B1 | 7/2002 | Stewart et al. |
| 6,415,227 B1 | 7/2002 | Lin |
| 6,434,530 B1 | 8/2002 | Sloane et al. |
| 6,452,498 B2 | 9/2002 | Stewart |
| 6,456,234 B1 | 9/2002 | Johnson |
| 6,477,581 B1 | 11/2002 | Carpenter |
| 6,490,519 B1 | 12/2002 | Lapidot et al. |
| 6,501,421 B1 | 12/2002 | Dutta et al. |
| 6,505,046 B1 | 1/2003 | Baker |
| 6,505,123 B1 | 1/2003 | Root et al. |
| 6,564,143 B1 | 5/2003 | Alewine et al. |
| 6,570,557 B1 | 5/2003 | Westerman et al. |
| 6,571,279 B1 | 5/2003 | Herz et al. |
| 6,574,484 B1 | 6/2003 | Carley |
| 6,587,835 B1 | 7/2003 | Treyz et al. |
| 6,611,687 B1 | 8/2003 | Clark et al. |
| 6,615,131 B1 | 9/2003 | Rennard et al. |
| 6,615,213 B1 | 9/2003 | Johnson |
| 6,647,257 B2 | 11/2003 | Owensby |
| 6,677,894 B2 | 1/2004 | Sheynblat et al. |
| 6,679,932 B2 | 1/2004 | Birler et al. |
| 6,681,120 B1 | 1/2004 | Kim |
| 6,697,018 B2 | 2/2004 | Stewart |
| 6,711,474 B1 | 3/2004 | Treyz et al. |
| 6,718,344 B2 | 4/2004 | Hirono |
| 6,731,236 B1 | 5/2004 | Hager et al. |
| 6,731,238 B2 | 5/2004 | Johnson |
| 6,741,188 B1 | 5/2004 | Miller et al. |
| 6,748,318 B1 | 6/2004 | Jones |
| 6,759,960 B2 | 7/2004 | Stewart |
| 6,762,772 B1 | 7/2004 | Imamura et al. |
| 6,795,686 B2 | 9/2004 | Master et al. |
| 6,810,323 B1 | 10/2004 | Bullock et al. |
| 6,816,782 B1 | 11/2004 | Walters et al. |
| 6,845,318 B1 | 1/2005 | Moore et al. |
| 6,847,891 B2 | 1/2005 | Pietras et al. |
| 6,847,969 B1 | 1/2005 | Mathai et al. |
| 6,853,911 B1 | 2/2005 | Sakarya |
| 6,853,917 B2 | 2/2005 | Miwa |
| 6,868,074 B1 | 3/2005 | Hanson |
| 6,888,536 B2 | 5/2005 | Westerman et al. |
| 6,912,398 B1 | 6/2005 | Domnitz |
| 6,944,447 B2 | 9/2005 | Portman et al. |
| 6,948,656 B2 | 9/2005 | Williams |
| 6,952,181 B2 | 10/2005 | Karr et al. |
| 6,954,735 B1 | 10/2005 | Djupsjobacka et al. |
| 6,975,959 B2 | 12/2005 | Dietrich et al. |
| 6,980,909 B2 | 12/2005 | Root et al. |
| 7,009,556 B2 | 3/2006 | Stewart |
| 7,044,372 B2 | 5/2006 | Okuda et al. |
| 7,058,594 B2 | 6/2006 | Stewart |
| 7,082,365 B2 | 7/2006 | Sheha et al. |
| 7,096,030 B2 | 8/2006 | Huomo |
| 7,103,470 B2 | 9/2006 | Mintz |
| 7,117,015 B2 | 10/2006 | Scheinert et al. |
| 7,123,189 B2 | 10/2006 | Lalik et al. |
| 7,165,725 B2 | 1/2007 | Casey |
| 7,187,997 B2 | 3/2007 | Johnson |
| 7,256,711 B2 | 8/2007 | Sheha et al. |
| 7,257,392 B2 | 8/2007 | Tang et al. |
| 7,298,327 B2 | 11/2007 | Dupray et al. |
| 7,310,516 B1 | 12/2007 | Vacanti et al. |
| 7,339,496 B2 | 3/2008 | Endo et al. |

| | | |
|---|---|---|
| 7,343,564 B2 | 3/2008 | Othmer |
| 7,349,706 B2 | 3/2008 | Kim et al. |
| 7,359,713 B1 | 4/2008 | Tiwari |
| 7,370,283 B2 | 5/2008 | Othmer |
| 7,386,396 B2 | 6/2008 | Johnson |
| 7,427,021 B2 | 9/2008 | Kemper et al. |
| 7,500,607 B2 | 3/2009 | Williams |
| 7,512,487 B1 * | 3/2009 | Golding et al. ............... 701/424 |
| 7,525,484 B2 | 4/2009 | Dupray et al. |
| 2001/0018349 A1 | 8/2001 | Kinnunen et al. |
| 2002/0035493 A1 | 3/2002 | Mozayeny et al. |
| 2002/0035609 A1 | 3/2002 | Lessard et al. |
| 2002/0042266 A1 | 4/2002 | Heyward et al. |
| 2002/0046069 A1 | 4/2002 | Mozayeny et al. |
| 2002/0046077 A1 | 4/2002 | Mozayeny et al. |
| 2002/0046084 A1 | 4/2002 | Steele et al. |
| 2002/0091991 A1 | 7/2002 | Castro |
| 2002/0140560 A1 | 10/2002 | Altman et al. |
| 2002/0160815 A1 | 10/2002 | Patel et al. |
| 2002/0167442 A1 | 11/2002 | Taylor |
| 2003/0069683 A1 | 4/2003 | Lapidot et al. |
| 2003/0093217 A1 * | 5/2003 | Petzold et al. ............... 701/201 |
| 2003/0100326 A1 | 5/2003 | Grube et al. |
| 2003/0101225 A1 | 5/2003 | Han et al. |
| 2003/0134657 A1 | 7/2003 | Norta et al. |
| 2003/0144793 A1 | 7/2003 | Melaku et al. |
| 2003/0236106 A1 | 12/2003 | Master et al. |
| 2004/0036649 A1 | 2/2004 | Taylor |
| 2004/0054428 A1 | 3/2004 | Sheha et al. |
| 2004/0128067 A1 | 7/2004 | Smith |
| 2004/0151151 A1 | 8/2004 | Kubler et al. |
| 2004/0158401 A1 | 8/2004 | Yoon |
| 2004/0158584 A1 | 8/2004 | Necsoiu et al. |
| 2004/0172409 A1 | 9/2004 | James |
| 2004/0176907 A1 | 9/2004 | Nesbitt |
| 2004/0198379 A1 | 10/2004 | Magee et al. |
| 2004/0203836 A1 | 10/2004 | Gorday et al. |
| 2004/0203909 A1 | 10/2004 | Koster |
| 2004/0228330 A1 | 11/2004 | Kubler et al. |
| 2004/0236504 A1 | 11/2004 | Bickford et al. |
| 2004/0242149 A1 | 12/2004 | Luneau |
| 2004/0246940 A1 | 12/2004 | Kubler et al. |
| 2004/0248586 A1 | 12/2004 | Patel et al. |
| 2004/0260939 A1 | 12/2004 | Ichikawa et al. |
| 2004/0264442 A1 | 12/2004 | Kubler et al. |
| 2005/0002419 A1 | 1/2005 | Doviak et al. |
| 2005/0004838 A1 | 1/2005 | Perkowski et al. |
| 2005/0027442 A1 | 2/2005 | Kelley et al. |
| 2005/0075116 A1 * | 4/2005 | Laird et al. ............... 455/456.3 |
| 2005/0085272 A1 | 4/2005 | Anderson et al. |
| 2005/0096840 A1 | 5/2005 | Simske |
| 2005/0114021 A1 | 5/2005 | Krull et al. |
| 2005/0149250 A1 | 7/2005 | Isaac |
| 2005/0153681 A1 | 7/2005 | Hanson |
| 2005/0197767 A1 | 9/2005 | Nortrup |
| 2005/0221808 A1 | 10/2005 | Karlsson et al. |
| 2005/0221843 A1 | 10/2005 | Friedman et al. |
| 2005/0222756 A1 | 10/2005 | Davis et al. |
| 2005/0227709 A1 | 10/2005 | Chang et al. |
| 2005/0228860 A1 | 10/2005 | Hamynen et al. |
| 2005/0239477 A1 | 10/2005 | Kim et al. |
| 2005/0250440 A1 | 11/2005 | Zhou et al. |
| 2005/0286421 A1 | 12/2005 | Janacek |
| 2006/0015249 A1 | 1/2006 | Gieseke |
| 2006/0022048 A1 | 2/2006 | Johnson |
| 2006/0025158 A1 | 2/2006 | Leblanc et al. |
| 2006/0041377 A1 | 2/2006 | Jung et al. |
| 2006/0041378 A1 | 2/2006 | Cheng et al. |
| 2006/0058955 A1 | 3/2006 | Mehren |
| 2006/0085392 A1 | 4/2006 | Wang et al. |
| 2006/0094353 A1 | 5/2006 | Neilson et al. |
| 2006/0111122 A1 | 5/2006 | Carlsan et al. |
| 2006/0180649 A1 | 8/2006 | Casey |
| 2006/0184978 A1 | 8/2006 | Casey |
| 2006/0195481 A1 | 8/2006 | Arrouye et al. |
| 2006/0202819 A1 | 9/2006 | Adamczyk et al. |
| 2006/0211453 A1 | 9/2006 | Schick |
| 2006/0218209 A1 | 9/2006 | Arrouye et al. |
| 2006/0229802 A1 | 10/2006 | Vertelney et al. |
| 2006/0237385 A1 | 10/2006 | Williamson et al. |
| 2006/0284767 A1 | 12/2006 | Taylor |
| 2006/0287824 A1 | 12/2006 | Lin |
| 2007/0001875 A1 | 1/2007 | Taylor |
| 2007/0005188 A1 | 1/2007 | Johnson |
| 2007/0005233 A1 | 1/2007 | Pinkus et al. |
| 2007/0010942 A1 | 1/2007 | Bill |
| 2007/0016362 A1 | 1/2007 | Nelson |
| 2007/0042790 A1 | 2/2007 | Mohi et al. |
| 2007/0055684 A1 | 3/2007 | Steven |
| 2007/0061245 A1 | 3/2007 | Ramer et al. |
| 2007/0061363 A1 | 3/2007 | Ramer et al. |
| 2007/0073480 A1 | 3/2007 | Singh |
| 2007/0073719 A1 | 3/2007 | Ramer et al. |
| 2007/0093258 A1 | 4/2007 | Steenstra et al. |
| 2007/0106465 A1 | 5/2007 | Adam et al. |
| 2007/0115868 A1 | 5/2007 | Chen et al. |
| 2007/0124043 A1 | 5/2007 | Ayoub et al. |
| 2007/0124066 A1 | 5/2007 | Kikuchi |
| 2007/0127439 A1 | 5/2007 | Yokohama |
| 2007/0129888 A1 | 6/2007 | Rosenberg |
| 2007/0130153 A1 | 6/2007 | Nachman et al. |
| 2007/0135136 A1 | 6/2007 | Ische |
| 2007/0135990 A1 | 6/2007 | Seymour et al. |
| 2007/0149212 A1 | 6/2007 | Gupta et al. |
| 2007/0150320 A1 | 6/2007 | Huang |
| 2007/0153983 A1 | 7/2007 | Bloebaum et al. |
| 2007/0153984 A1 | 7/2007 | Bloebaum et al. |
| 2007/0153986 A1 | 7/2007 | Bloebaum et al. |
| 2007/0156326 A1 | 7/2007 | Nesbitt |
| 2007/0179854 A1 | 8/2007 | Ziv et al. |
| 2007/0198304 A1 * | 8/2007 | Cohen et al. ............... 705/5 |
| 2007/0204218 A1 | 8/2007 | Weber et al. |
| 2007/0206730 A1 | 9/2007 | Polk |
| 2007/0219706 A1 | 9/2007 | Sheynblat |
| 2007/0232326 A1 | 10/2007 | Johnson |
| 2007/0233387 A1 | 10/2007 | Johnson |
| 2007/0254676 A1 | 11/2007 | Pedigo et al. |
| 2007/0260751 A1 | 11/2007 | Meesseman |
| 2007/0271328 A1 | 11/2007 | Geelen et al. |
| 2007/0276586 A1 | 11/2007 | Jeon et al. |
| 2007/0276587 A1 | 11/2007 | Johnson |
| 2007/0276596 A1 | 11/2007 | Solomon et al. |
| 2007/0282521 A1 | 12/2007 | Broughton |
| 2007/0299601 A1 | 12/2007 | Zhao et al. |
| 2008/0004802 A1 | 1/2008 | Horvitz |
| 2008/0005104 A1 | 1/2008 | Flake et al. |
| 2008/0005301 A1 | 1/2008 | Li et al. |
| 2008/0015422 A1 | 1/2008 | Wessel |
| 2008/0021632 A1 | 1/2008 | Amano |
| 2008/0024360 A1 | 1/2008 | Taylor |
| 2008/0024364 A1 | 1/2008 | Frederick Taylor |
| 2008/0027636 A1 | 1/2008 | Tengler et al. |
| 2008/0030308 A1 | 2/2008 | Johnson |
| 2008/0032703 A1 | 2/2008 | Krumm et al. |
| 2008/0045234 A1 | 2/2008 | Reed |
| 2008/0052407 A1 | 2/2008 | Baudino et al. |
| 2008/0070593 A1 | 3/2008 | Altman et al. |
| 2008/0071466 A1 | 3/2008 | Downs et al. |
| 2008/0082254 A1 | 4/2008 | Huhtala et al. |
| 2008/0085727 A1 | 4/2008 | Kratz |
| 2008/0086240 A1 | 4/2008 | Breed |
| 2008/0091347 A1 | 4/2008 | Tashiro |
| 2008/0097698 A1 | 4/2008 | Arnold-Huyser et al. |
| 2008/0098090 A1 | 4/2008 | Geraci et al. |
| 2008/0104634 A1 | 5/2008 | Gajdos et al. |
| 2008/0109153 A1 | 5/2008 | Gueziec |
| 2008/0113672 A1 | 5/2008 | Karr et al. |
| 2008/0129528 A1 | 6/2008 | Guthrie |
| 2008/0132243 A1 | 6/2008 | Spalink et al. |
| 2008/0132251 A1 | 6/2008 | Altman et al. |
| 2008/0132252 A1 | 6/2008 | Altman et al. |
| 2008/0140308 A1 | 6/2008 | Yamane et al. |
| 2008/0140520 A1 | 6/2008 | Hyder et al. |
| 2008/0153512 A1 | 6/2008 | Kale et al. |
| 2008/0153513 A1 | 6/2008 | Flake et al. |
| 2008/0155453 A1 | 6/2008 | Othmer |
| 2008/0161034 A1 | 7/2008 | Akiyama |
| 2008/0167083 A1 | 7/2008 | Wyld et al. |

| | | | | | | |
|---|---|---|---|---|---|---|
| 2008/0167811 | A1 | 7/2008 | Geelen | JP | 2005-182146 | 7/2005 |
| 2008/0172173 | A1 | 7/2008 | Chang et al. | JP | 2005-241519 | 9/2005 |
| 2008/0172374 | A1 | 7/2008 | Wolosin et al. | JP | 2006-112338 | 4/2006 |
| 2008/0176545 | A1 | 7/2008 | Dicke et al. | JP | 2006-184007 | 7/2006 |
| 2008/0177793 | A1 | 7/2008 | Epstein et al. | JP | 2006-270889 | 10/2006 |
| 2008/0189033 | A1 | 8/2008 | Geelen et al. | JP | 2006-279838 | 10/2006 |
| 2008/0249667 | A1 | 10/2008 | Horvitz et al. | JP | 2007-033220 | 2/2007 |
| 2008/0271072 | A1 | 10/2008 | Rothschild et al. | JP | 2007-033368 | 2/2007 |
| 2008/0318550 | A1 | 12/2008 | DeAtley | JP | 2007033331 A | 2/2007 |
| 2009/0003659 | A1 | 1/2009 | Forstall et al. | JP | 2007-127439 | 5/2007 |
| 2009/0005005 | A1 | 1/2009 | Forstall et al. | JP | 2007-147439 | 6/2007 |
| 2009/0005018 | A1 | 1/2009 | Forstall et al. | JP | 2007-201699 | 8/2007 |
| 2009/0005021 | A1 | 1/2009 | Forstall et al. | JP | 2007240400 A | 9/2007 |
| 2009/0005068 | A1 | 1/2009 | Forstall et al. | JP | 2007-259291 | 10/2007 |
| 2009/0005070 | A1 | 1/2009 | Forstall et al. | JP | 2007-271299 | 10/2007 |
| 2009/0005071 | A1 | 1/2009 | Forstall et al. | JP | 2007-304009 | 11/2007 |
| 2009/0005072 | A1 | 1/2009 | Forstall et al. | JP | 2008-058917 | 3/2008 |
| 2009/0005076 | A1 | 1/2009 | Forstall et al. | JP | 2008-129774 | 6/2008 |
| 2009/0005080 | A1 | 1/2009 | Forstall et al. | KR | 2004-102440 | 12/2004 |
| 2009/0005964 | A1 | 1/2009 | Forstall et al. | KR | 2005-096746 | 10/2005 |
| 2009/0005965 | A1 | 1/2009 | Forstall et al. | TW | 200426387 | 12/2004 |
| 2009/0005975 | A1 | 1/2009 | Forstall et al. | WO | WO 93/20546 | 10/1993 |
| 2009/0005978 | A1 | 1/2009 | Forstall et al. | WO | WO 97/07467 | 2/1997 |
| 2009/0005981 | A1 | 1/2009 | Forstall et al. | WO | WO 97/24577 | 7/1997 |
| 2009/0006336 | A1 | 1/2009 | Forstall et al. | WO | WO 98/03951 | 1/1998 |
| 2009/0030605 | A1 | 1/2009 | Breed | WO | WO 98/07112 | 2/1998 |
| 2009/0031006 | A1 | 1/2009 | Johnson | WO | WO 98/54682 | 12/1998 |
| 2009/0033540 | A1 | 2/2009 | Breed et al. | WO | WO 99/16036 | 4/1999 |
| 2009/0089706 | A1 | 4/2009 | Furches et al. | WO | WO 99/44183 | 9/1999 |
| 2009/0098857 | A1 | 4/2009 | DeAtley | WO | WO 01/37597 | 5/2001 |
| 2009/0177385 | A1 | 7/2009 | Matas et al. | WO | WO 02/054813 | 7/2002 |
| 2009/0182492 | A1 | 7/2009 | Alten | WO | WO 03/023593 | 3/2003 |
| 2009/0259573 | A1 | 10/2009 | Cheng et al. | WO | WO 03/096055 | 11/2003 |
| 2009/0271271 | A1 | 10/2009 | Johnson | WO | WO 2004/008792 | 1/2004 |
| 2009/0281724 | A1 | 11/2009 | Blumenberg et al. | WO | WO 2004/021730 | 3/2004 |
| 2009/0286549 | A1 | 11/2009 | Sazegari et al. | WO | WO 2004/061576 | 7/2004 |
| | | | | WO | WO 2004/076977 | 9/2004 |

FOREIGN PATENT DOCUMENTS

| | | |
|---|---|---|
| CA | 2287596 | 4/2000 |
| CA | 2432239 | 12/2004 |
| DE | 4437360 | 4/1996 |
| DE | 19506890 | 8/1996 |
| DE | 19914257 | 3/1999 |
| DE | 10 141 695 | 3/2003 |
| EP | 785535 | 7/1997 |
| EP | 0 809 117 | 11/1997 |
| EP | 0 699 330 B1 | 4/1998 |
| EP | 0 908 835 | 4/1999 |
| EP | 0 997 808 | 5/2000 |
| EP | 1 300 652 | 4/2003 |
| EP | 1 457 928 | 9/2004 |
| EP | 1 469 287 | 10/2004 |
| EP | 1 496 338 | 1/2005 |
| EP | 1 770 956 | 9/2005 |
| EP | 1 465 041 | 2/2006 |
| EP | 1 659 817 | 5/2006 |
| EP | 1 790 947 | 5/2007 |
| EP | 1 860 904 | 11/2007 |
| FR | 2730083 | 8/1996 |
| FR | 2272911 | 6/1999 |
| FR | 2810183 | 12/2001 |
| GB | 2 359 888 | 5/2001 |
| GB | 2 407 230 | 4/2005 |
| JP | 62142215 | 6/1987 |
| JP | 05-071974 | 3/1993 |
| JP | 06-525189 | 5/1994 |
| JP | 2007-221433 | 5/1994 |
| JP | 9-062993 | 7/1997 |
| JP | 9-210710 | 8/1997 |
| JP | 11-234736 | 8/1999 |
| JP | 2000-163379 | 6/2000 |
| JP | 2001-160063 | 6/2001 |
| JP | 2002-310680 | 10/2002 |
| JP | 10-030933 | 2/2003 |
| JP | 2003-228532 | 8/2003 |
| JP | 2004045054 A | 2/2004 |
| JP | 2004-219146 | 7/2004 |
| JP | 2004-362271 | 12/2004 |
| JP | 2005106741 A | 4/2005 |

| | | |
|---|---|---|
| WO | WO 2005/006258 | 1/2005 |
| WO | WO 2006/065856 | 6/2006 |
| WO | WO 2006/113125 | 10/2006 |
| WO | WO 2007/052285 | 5/2007 |
| WO | WO 2008/051929 | 5/2008 |
| WO | WO 2008/085740 | 7/2008 |
| WO | WO 2009/140031 | 11/2009 |

OTHER PUBLICATIONS

"Animated Transition"; [online] [Retrieved on Oct. 16, 2006] Retrieved from the Internet <URL: http://designinterfaces.com/Animated_Transition; 2 pages.

"DaimlerCrysler Guide5 Usecases Overview Map", 1 page. (no reference date).

"International Roaming Guide—Personal Experience(s) from Customer and Community Member"; [online] [Retrieved Jun. 26, 2006] Retrieved from the Internet <URL: http://forums.cingular.com/cng/board/message?board.id=1185; 6 pages.

"iPhone Software/Hardware Hack: LocoGPS—GPS Add-on for the iPhone"; [online] [Retrieved on Dec. 25, 2007] Retrieved from the Internet <URL: http://www.iphonehacks.com/iphone_applications/index.html; 41 pages.

"Mio 269+ Users Manula"; 2005; 44 pages.

"New program for mobile blogging for PocketPC released: My Blog"; [online] [Retrieved on Apr. 5, 2006]; Retrieved from the Internet, URL: http://msmobiles.com/news.php/4067.html.

"Numbering and Dialing Plan within the United States", Alliance for Telecommunications Industry Solutions; 2005; 17 pages.

Review Guide—Google Maps for mobile (beta); Google; 2006; 7 pages.

"User-centered design of mobile solutions", NAMAHN, 2006, 18 pages.

"User's Manual MioMap 2.0"; Aug. 2005; 60 pages.

"Windows Live Search for Mobile Goes Final, Still Great"; [online] [Retrieved on Mar. 11, 2007]; Retrieved from the Internet, URL: http://gizmodo.com/gadgets/software/windows-live-search-for-mobile-goes-final-still-great-236002.php; 3 pages.

"Windows Mobile 6 Professional Video Tour"; [online] [Retrieved on Mar. 11, 2007]; Retrieved from the Internet, URL: http://gizmodo.

com/gadgets/cellphones/windows-mobile-6-professional-video-tour-237039.php; 4 pages.

"Windows Mobile"; Microsoft; 2007, 2 pages.

Anand et al., "Quantitative Analysis of Power Consumption for Location-Aware Applications on Smart Phones", IEEE International Symposium on Industrial Electronics, 2007.

Balliet, "Transportation Information Distribution System", IBM Technical Disclosure Bulletin, [online] [Retrieved Nov. 7, 2008] Retrieved from the Internet, URL: https://www.delphion.com/tdbs/tdb?order=86A+61395; Jun. 1986; 2 pages.

Beard et al., "Estimating Positions and Paths of Moving Objects", IEEE 2000, pp. 1-8.

Bederson, B.B., Audio Augmented Reality: A Prototype Automated Tour Guide [online] [retrieved on Aug. 30, 2002] [retrieved from http://www.cs.umd.edu/~bederson/papers/chi-95-aar/] pp. 1-4.

Berman et al., "The Role of Dead Reckoning and Inertial Sensors in Future General Aviation Navigation", IEEE, 1998, pp. 510-517.

Bevly et al., "Cascaded Kalman Filters for Accurate Estimation of Multiple Biases, Dead-Reckoning Navigation, and Full State Feedback Control of Ground Vehicles", IEEE Transactions on Control Systems in Technology, vol. 15, No. 2, Mar. 2007, pp. 199-208.

Binzhuo et al., "Mobile Phone GIS Based on Mobile SVG", IEEE 2005.

Bokharouss et al., "A Location-Aware Mobile Call Handling Assistant", International Conference on Advanced Information Networking and Applications Workshops, 2007.

Boonsrimuang et al., "Mobile Internet Navigation System", IEEE, 2002, pp. 325-328.

Camp et al., "A computer-based method for predicting transit time systems", Decsision Sciences, vol. 5, pp. 339-346, 1974.

Carew; "Phones that tell you where to drive, meet, eat"; [online] [Retrieved May 26, 2007]; Retrieved from the Internet <URL htttp://news.yahoo.com/s/nm/20070525/wr_nm/column_pluggedin_dc_2&printer=1;_ylt=Ahqaftn7xmlS2rOFZFeu9G4ht.cA; 2 pages.

Charny, "AT&T puts 411 to the text"; [online] [Retrieved Mar. 4, 2009]; Retrieved from the Internet <URL http://news.cnet.com/ATT-puts-411-to-the-text/2100-1039_3-1000669.html; May 8, 2003; 2 pages.

Cho et al., A Traveler Information Service Structure in Hybrid T-DMB and Cellular Communication Network, Broadcast Systems Research Group, IEEE, 2006, pp. 747-750.

Christie et al., "Development and Deployment of GPS wireless devices for E911 and Location based services", IEEE 2002.

Chua et al., "Intelligent Portal for Event-triggered SMS Alerts", 2nd International Conference on Mobile Technology, Applications and Systems, 2005.

Civilis et al., "Efficient Tracking of Moving Objects with Precision Guarantees", IEEE, Proceedings of the First Annual International Conference on Mobile and Ubiquitous Systems: Networking and Services, 2004, 10 pages.

Dibdin, Peter, "Where are mobile location based services?", Dec. 14, 2001, pp. 1-8.

Dunn et al., "Wireless Emergency Call System", IBM TDB, Sep. 1994.

Ebine, "Dual Frequency resonant base station antennas for PDC systems in Japan", IEEE, pp. 564-567, 1999.

FM 3-25.26 Map Reading and Land Navigation Field Manual No. 3-25.26, Headquarters Department of the Army, Washington, DC [online] [retrieved on Apr. 9, 2004] [retrieved from http://155.217.58.58/cgi-bin/atdl.dll/fm/3-25.26/toc.htm] Jul. 20, 2001, pp. 1-7 and J-1 to J-3.

*GPS 12 Personal Navigator Owner's Manual & Reference*, Garmin Corporation, Jan. 1999, pp. 1-60.

Guo et al., "An Intelligent Query System based on Chinese Short Message Service for Restaurant Recommendation", IEEE 2007, 1 page.

Hameed et al., "An Intelligent Agent-Based Medication and Emergency System", IEEE 2006.

Helal et al., "Drishti: An Integrated Navigation System for Visually Impaired and Disabled", Fifth International Symposium on Wearable Computers (ISWC'01), IEEE, 2001, pp. 149-156.

Hohman et al., "GPS Roadside Integrated Precision Positioning System", Position Location and Navigation Symposium (IEEE 2000), pp. 221-230.

International Numbering and SMS—Type of Numbering, TON, Numbering Plan Indicator, NPI, [online] [Retrieved Jan. 5, 2007] Retrieved from the Internet <URL: http://www.activeexperts.com/support/activsms/tonnpi/.

Jain, R., Potential Networking Applications of Global Positioning Systems (GPS) [online] [retrieved on Nov. 18, 2008] [retrieved from http://arxiv.org/ftp/cs/papers/9809/9809079.pdf] OSU Technical Report TR-24, Apr. 1996, pp. 1-40.

Jirawimut et al., "A Method for Dead Reckoning Parameter Correction in Pedestrian Navigation System", IEEE Transactions on Instrumentation and Measurement, vol. 52, No. 1, Feb. 2003, pp. 209-215.

Ju et al., "RFID Data Collection and Integration based on Mobile Agent", IEEE, 2006.

Kbar et al., "Mobile Station Location based on Hybrid of Signal Strength and Time of Arrival", IEEE, 2005.

Koide et al., "3-D Human Navigation System with Consideration of Neighboring Space Information", IEEE International Conference on Systems, Man and Cybernetics, 2006 (SMC '06), vol. 2, (Oct. 8-11, 2006), pp. 1693-1698.

Lloyd et al., "Cellular phone base stations installation violate the Electromagnetic Compatibility regulations", IEEE, 2004.

Manabe et al., "On the M-CubITS Pedestrian Navigation System", IEEE, 2006, pp. 793-798.

Meier et al., "Location-Aware Event-Base Middleware: A Paradigm for Collaborative Mobile Applications?", Sep. 2003.

Miller et al., "Synchronization of Mobile XML Databases by Utilizing Deferred Views", IEEE 2004.

Nardi et al., "Integrating Communication and Information through Contact Map", Communications of the ACM, vol. 45, No. 4, Apr. 2002.

Northard, "Docking Station Communication Link", IBM TDB, Feb. 1994.

Oh et al., "Spatial Applications Using 4S Technology for Mobile Environment", IEEE 2002.

Parikh, "Tele Locate", IBM Technical Disclosure Bulletin, [online] [Retrieved Nov. 7, 2008] Retrieved from the Internet, URL: https://www.delphion.com/tdbs/tdb?order=92A+62775; Sep. 1992; 1 page.

Partial International Search Report, dated Jul. 29, 2008, issued in corresponding PCT/US2008/050295.

International Search Report and Written Opinion, dated Jun. 9, 2008, issued in Interntiaonal Application No. PCT/US2007/088880, filed Dec. 27, 2007.

Pfoser et al., "Dynamic Travel Time Maps—Enabling Efficient Navigation", Proceedings of the 18th International Conference on Scientific and Statistical Database Management (SSDBM'06), IEEE, 10 pages.

Portfolio 2007; [online] [Retrieved on Jun. 14, 2007]; Retrieved from the Internet, URL: http://eric.wahlforss.com/folio; 3 pages.

RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.

Rekimoto, J., *Augment-able Reality: Situated Communication through Physical and Digital Spaces*, iswc, pp. 68, Second International Symposium on Wearable computers (ISWC'98), 1998, pp. 1-8.

Rogers et al., "Adaptive User Interfaces for Automotive Environments", IEEE Intelligent Vehicles Symposium 2000, Oct. 3-5, 2000, pp. 662-667.

Rozier, J., *Hear & There: An Augmented Reality System of Linked Audio*, Proceedings of the International Conference on Auditory Display, Atlanta, GA, Apr. 2000, pp. 1-6.

Samadani et al., "PathMaker: Systems for Capturing Trips", IEEE (2004) International Conference on Multimedia and Expo., Publication Date: Jun. 27-30, 2004, vol. 3, pp. 2123-2126, 2004.

Schreiner, "Where We At? Mobile Phones Bring GPS to the Masses", IEEE Computers Society, May/Jun. 2007, pp. 6-11.

Spohrer. "New Paradigms for Using Computers", 1997; retrieved from the Internet, URL: <http://almaden.ibm.com/npuc97/1997/spohrer.htm>.

Sung et al., "Towards Reliable Peer-to-Peer Data Sharing over Mobile Ad hoc Networks", IEEE, 2005.
Weiss et al., "Zone services—An approach for location-based data collection", Proceedings of the 8th International Conference on E-commerce Technology and the 3rd IEEE International Conference on Enterprise Computing, E-Commerce and E-Services (8 pages), 2006.
Yang et al., "A Mutlimedia System for Route Sharing and Video-based Navigation", IEEE, 2006, pp. 73-76.
Yang et al. "Global Snapshots for Distributed Debugging", IEEE, pp. 436-440, 1992.
Yanyan et al., "The model of optimum route selection in vehicle automatic navigation system based on unblocked reliability analyses", IEEE 2003.
"Cyberguide: a mobile context-aware tour guide", Wireless Networks Archive (Special Issue: Mobile computing and networking; selecting papers from MobiCom '96), 3(5):421-433, 1997.
"Frontiers in electronic media", Interactions Archive 4(4):32-64, 1997.
"Location-aware mobile applications based on directory services", International Conference on Mobile Computing and Networking Archive, Proceedings on the 3rd Annual ACM/IEEE International Conference on Mobile Computing and Networking, Budapest, Hungary, pp. 23-33, 1997.
Sharpe et al., U.S. Appl. No. 12/434,586, filed May 1, 2009.
Sharpe et al., U.S. Appl. No. 12/434,582, filed May 1, 2009.
Van Os et al., U.S. Appl. No. 12/165,413, filed Jun. 30, 2008.
Blumenberg et al., U.S. Appl. No. 12/119,316, filed May 12, 2008.
Low et al., U.S. Appl. No. 12/233,358, filed Sep. 18, 2008.
Sazegari et al., U.S. Appl. No. 12/122,339, filed May 16, 2008.
Johnson, U.S. Appl. No. 12/044,363, filed Mar. 7, 2008.
Johnson, U.S. Appl. No. 11/827,065, filed Jul. 10, 2007.
Herz, U.S. Appl. No. 12/270,814, filed Nov. 13, 2008.
Budka et al., "A Bayesian method to Improve Mobile Geolocation Accuracy", IEEE, 2002, pp. 1021-1025.
Yamamoto et al., "Position Location Technologies Using Signal Strength in Cellular Systems", IEEE, 2001, pp. 2570-2575.
International Search Report and Written Opinion, dated Oct. 1, 2009, issued in PCT/US2009/041298.
Weiss et al., "Zone services—An approach for location-based data collection", Proceedings of the 8th International Conference on E-commerce Technology and the 3rd IEEE International Conference on Enterprise Computing, E-Commerce and E-Services, 2006; 8 pages.
Drane et al., "The accurate location of mobile telephones", Third Annual World Congress on Intelligent Transport Systems, Orlando, Florida, Oct. 1996.
"Travel Time Data Collection Handbook—Chapter 5: Its Probe Vehicle Techniques", FHWA-PL-98-035 Report, Department of Transport, University of Texas, Mar. 1998; [online] [Retrieved from the Internet at http://www.fhwa.dot.gov/ohim/handbook/chap5.pdf.
Ygnace et al., "Travel Time Estimation on the San Francisco Bay Area Network Using Cellular Phones as Probes", Working Paper, Institute of Transportation Studies, University of California, Berkeley, 2000.
Wang et al., "A Unified Vehicle Supervising and Traffic Information System", IEEE, 1996, pp. 968-972.
Evans, "In-vehicle Man-Machine Interaction the Socrates Approach", Vehicle Navigation & Information System Conference Proceedings, 1994, Aug. 31-Sep. 2, 1994 pp. 473-477.
Paksoy et al., "The Global Position System—Navigation Tool of the Future", Journal of Electrical & Electronics, vol. 2 No. 1, pp. 467-476 (2002).
Dalrymple, "Google Maps adds locator, but not for iPhone," [online] [Retrieved Nov. 30, 2007]; Retrieved from the Internet URL: http://news.yahoo.com/s/macworld/20071130/tc_macworld/googlemaps20071130_0&printer=1;_ylt=Auvf3s6LQK_pOaJ1b954T_DQn6gB; 1 page.
Feddema et al., "Cooperative Sentry Vehicles and Differential GPS Leapfrog," 2000, *United States Department of Energy*, pp. 1-12.
Maxwell et al., "Alfred: The Robot Waiter Who Remembers You," *AAAI Technical Report WS-99-15*, 1999, 12 pages.
Shibata et al., "Development and Integration of Generic Components for a Teachable Vision-Based Mobile Robot," *IEEE/ASME Transactions on Mechatronics*, 1996, 1(3):230-236.
Yogesh C. Rathod, Third Party Submission in U.S. Appl. No. 12/233,358 mailed Mar. 30, 2010, 12 pages.
US 7,254,416, 08/2007, Kim (withdrawn)

* cited by examiner

DISFAVORED ROUTE PROGRESSIONS OR LOCATIONS

CROSS-REFERENCE TO RELATED APPLICATION

This application claims priority to U.S. Provisional Patent Application Ser. No. 60/946,837 filed Jun. 28, 2007, and entitled "DISFAVORED ROUTE PROGRESSIONS OR LOCATIONS" the contents of which are incorporated herein by reference.

BACKGROUND

This disclosure relates to navigation using a mobile device.

Navigation systems have begun to include functionality for inclusion of traffic data overlaying a navigation interface. Such navigation systems, however, provide little intelligence other than the ability to navigate from an origination point to a destination point. Because a user often has some intelligence about routes to a location, in many instances the user ignores navigation routes provided by the navigation system in favor of the routes the user knows. Additionally, current navigation systems do not readily facilitate navigation to a destination if a user desires to travel a different route while enroute on the route recommended by the navigation system.

SUMMARY

In one aspect, systems, methods, apparatuses and computer program products are provided. In one aspect, methods are disclosed, which comprise: receiving a preference comprising disfavored route progressions or disfavored locations associated with a user; identifying destination information associated with a user; identifying one or more potential routes comprising a plurality of route progressions based on a current location and the destination information; analyzing the plurality of route progressions associated with the one or more potential routes based on the disfavored route progressions or disfavored locations associated with the user; and presenting one or more routes to the user based on the analysis.

Systems can include a preference engine, a destination engine, a routing engine, an analysis engine, and a presentation engine. The preference engine can receive disfavored route progressions or disfavored locations associated with a user. The routing engine can identify routes, each route including a plurality of route progressions. The identification of the routes can be based on a current location and the destination information. The analysis engine can analyze the plurality of route progressions associated with the potential routes based upon the disfavored route progressions or disfavored locations. The presentation engine can present preferred routes to the user, the preferred routes being based on results from the analysis engine.

Systems and methods as described can facilitate navigation of roads by directing a user to use routes that do not include disfavored route progressions or locations associated with the user.

DETAILED DESCRIPTION

Figure 1:
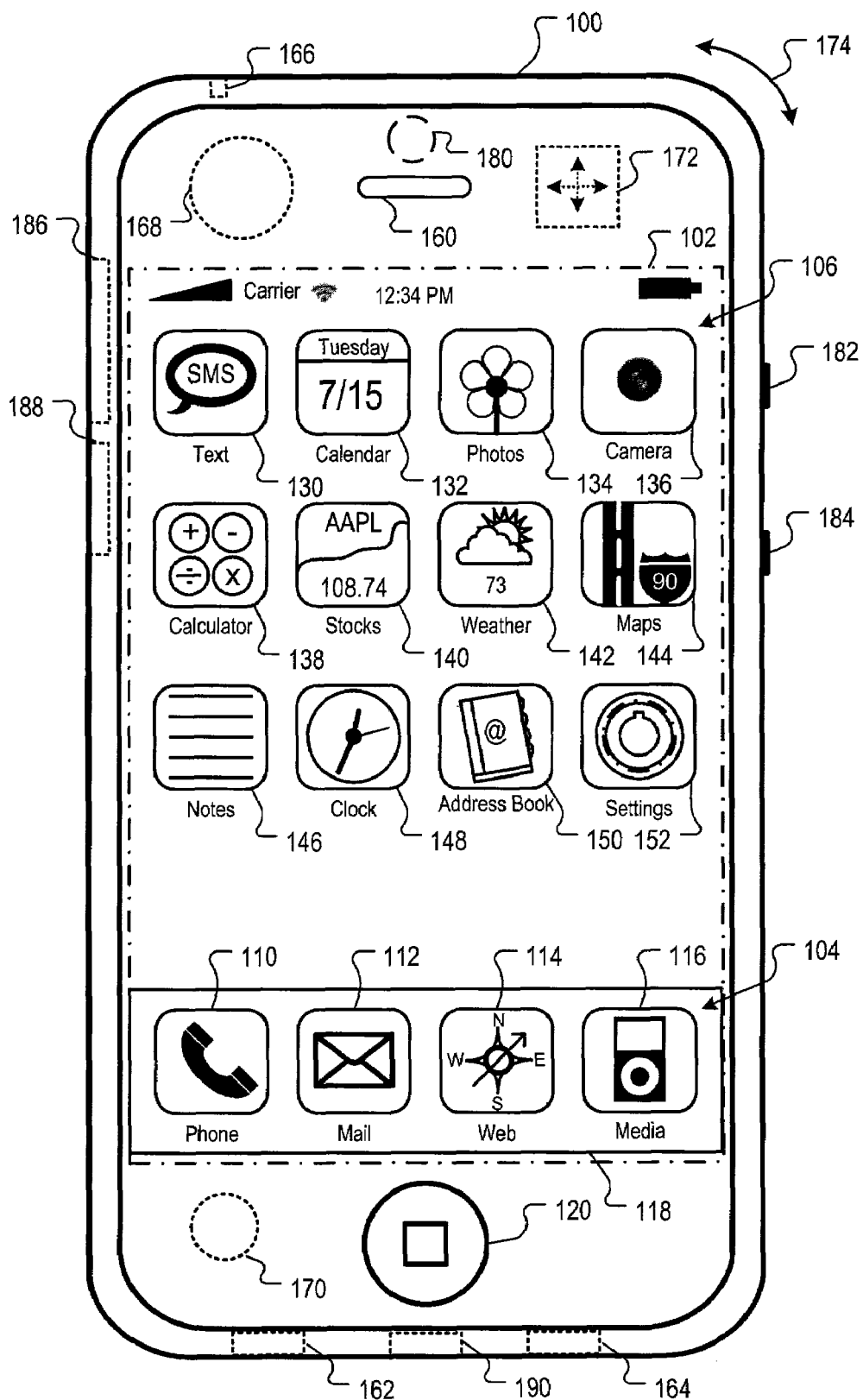
FIG. 1 is a block diagram of an example mobile device.

FIG. 1 is a block diagram of an example mobile device 100. The mobile device 100 can be, for example, a handheld computer, a personal digital assistant, a cellular telephone, a network appliance, a camera, a smart phone, an enhanced general packet radio service (EGPRS) mobile phone, a network base station, a media player, a navigation device, an email device, a game console, or other device or a combination of any two or more of these data processing devices or other data processing devices.

Mobile Device Overview

In some implementations, the mobile device 100 includes a touch-sensitive display 102. The touch-sensitive display 102 can implement liquid crystal display (LCD) technology, light emitting polymer display (LPD) technology, or some other display technology. The touch-sensitive display 102 can be sensitive to haptic and/or tactile contact with a user.

In some implementations, the touch-sensitive display 102 can comprise a multi-touch-sensitive display 102. A multi-touch-sensitive display 102 can, for example, process multiple simultaneous touch points, including processing data related to the pressure, degree and/or position of each touch point. Such processing facilitates gestures and interactions with multiple fingers, chording, and other interactions. Other touch-sensitive display technologies can also be used, e.g., a display in which contact is made using a stylus or other pointing device. Some examples of multi-touch-sensitive display technology are described in U.S. Pat. Nos. 6,323,846, 6,570,557, 6,677,932, and U.S. Patent Publication 2002/0015024A1, each of which is incorporated by reference herein in its entirety.

In some implementations, the mobile device 100 can display one or more graphical user interfaces on the touch-sensitive display 102 for providing the user access to various system objects and for conveying information to the user. In some implementations, the graphical user interface can include one or more display objects 104, 106. In the example shown, the display objects 104, 106, are graphic representations of system objects. Some examples of system objects include device functions, applications, windows, files, alerts, events, or other identifiable system objects.

Example Mobile Device Functionality

In some implementations, the mobile device 100 can implement multiple device functionalities, such as a telephony device, as indicated by a phone object 110; an e-mail device, as indicated by the e-mail object 112; a network data communication device, as indicated by the Web object 114; a Wi-Fi base station device (not shown); and a media processing device, as indicated by the media player object 116. In some implementations, particular display objects 104, e.g., the phone object 110, the e-mail object 112, the Web object 114, and the media player object 116 can be displayed in a menu bar 118. In some implementations, device functionalities can be accessed from a top-level graphical user interface, such as the graphical user interface illustrated in FIG. 1. Touching one of the objects 110, 112, 114 or 116 can, for example, invoke corresponding functionality.

In some implementations, the mobile device 100 can implement network distribution functionality. For example, the functionality can enable the user to take the mobile device 100 and its associated network while traveling. In particular, the mobile device 100 can extend Internet access (e.g., Wi-Fi) to other wireless devices in the vicinity. For example, mobile device 100 can be configured as a base station for one or more devices. As such, mobile device 100 can grant or deny network access to other wireless devices.

In some implementations, upon invocation of device functionality, the graphical user interface of the mobile device 100 changes, or is augmented or replaced with another user interface or user interface elements, to facilitate user access to particular functions associated with the corresponding device functionality. For example, in response to a user touching the phone object 110, the graphical user interface of the touch-sensitive display 102 may present display objects related to various phone functions; likewise, touching of the email object 112 may cause the graphical user interface to present display objects related to various e-mail functions; touching the Web object 114 may cause the graphical user interface to present display objects related to various Web-surfing functions; and touching the media player object 116 may cause the graphical user interface to present display objects related to various media processing functions.

In some implementations, the top-level graphical user interface environment or state of FIG. 1 can be restored by pressing a button 120 located near the bottom of the mobile device 100. In some implementations, each corresponding device functionality may have corresponding "home" display objects displayed on the touch-sensitive display 102, and the graphical user interface environment of FIG. 1 can be restored by pressing the "home" display object.

In some implementations, the top-level graphical user interface can include additional display objects 106, such as a short messaging service (SMS) object 130, a calendar object 132, a photos object 134, a camera object 136, a calculator object 138, a stocks object 140, a weather object 142, a maps object 144, a notes object 146, a clock object 148, an address book object 150, and a settings object 152. Touching the SMS display object 130 can, for example, invoke an SMS messaging environment and supporting functionality; likewise, each selection of a display object 130, 132, 134, 136, 138, 140, 142, 144, 146, 148, 150 and 152 can invoke a corresponding object environment and functionality.

Additional and/or different display objects can also be displayed in the graphical user interface of FIG. 1. For example, if the device 100 is functioning as a base station for other devices, one or more "connection" objects may appear in the graphical user interface to indicate the connection. In some implementations, the display objects 106 can be configured by a user, e.g., a user may specify which display objects 106 are displayed, and/or may download additional applications or other software that provides other functionalities and corresponding display objects.

In some implementations, the mobile device 100 can include one or more input/output (I/O) devices and/or sensor devices. For example, a speaker 160 and a microphone 162 can be included to facilitate voice-enabled functionalities, such as phone and voice mail functions. In some implementations, a loud speaker 164 can be included to facilitate hands-free voice functionalities, such as speaker phone functions. An audio jack 166 can also be included for use of headphones and/or a microphone.

In some implementations, a proximity sensor 168 can be included to facilitate the detection of the user positioning the mobile device 100 proximate to the user's ear and, in response, to disengage the touch-sensitive display 102 to prevent accidental function invocations. In some implementations, the touch-sensitive display 102 can be turned off to conserve additional power when the mobile device 100 is proximate to the user's ear.

Other sensors can also be used. For example, in some implementations, an ambient light sensor 170 can be utilized to facilitate adjusting the brightness of the touch-sensitive display 102. In some implementations, an accelerometer 172 can be utilized to detect movement of the mobile device 100, as indicated by the directional arrow 174. Accordingly, display objects and/or media can be presented according to a detected orientation, e.g., portrait or landscape. In some implementations, the mobile device 100 may include circuitry and sensors for supporting a location determining capability, such as that provided by the global positioning system (GPS) or other positioning systems (e.g., systems using Wi-Fi access points, television signals, cellular grids, Uniform Resource Locators (URLs)). In some implementations, a positioning system (e.g., a GPS receiver) can be integrated into the mobile device 100 or provided as a separate device that can be coupled to the mobile device 100 through an interface (e.g., port device 190) to provide access to location-based services.

The mobile device 100 can also include a camera lens and sensor 180. In some implementations, the camera lens and sensor 180 can be located on the back surface of the mobile device 100. The camera can capture still images and/or video.

The mobile device 100 can also include one or more wireless communication subsystems, such as an 802.11b/g communication device 186, and/or a Bluetooth™ communication device 188. Other communication protocols can also be supported, including other 802.x communication protocols (e.g., WiMax, Wi-Fi, 3G), code division multiple access (CDMA), global system for mobile communications (GSM), Enhanced Data GSM Environment (EDGE), etc.

In some implementations, a port device 190, e.g., a Universal Serial Bus (USB) port, or a docking port, or some other wired port connection, can be included. The port device 190 can, for example, be utilized to establish a wired connection to other computing devices, such as other communication devices 100, network access devices, a personal computer, a printer, or other processing devices capable of receiving and/or transmitting data. In some implementations, the port device 190 allows the mobile device 100 to synchronize with a host device using one or more protocols, such as, for example, the TCP/IP, HTTP, UDP and any other known protocol. In some implementations, a TCP/IP over USB protocol can be used.

Network Operating Environment

Figure 2:
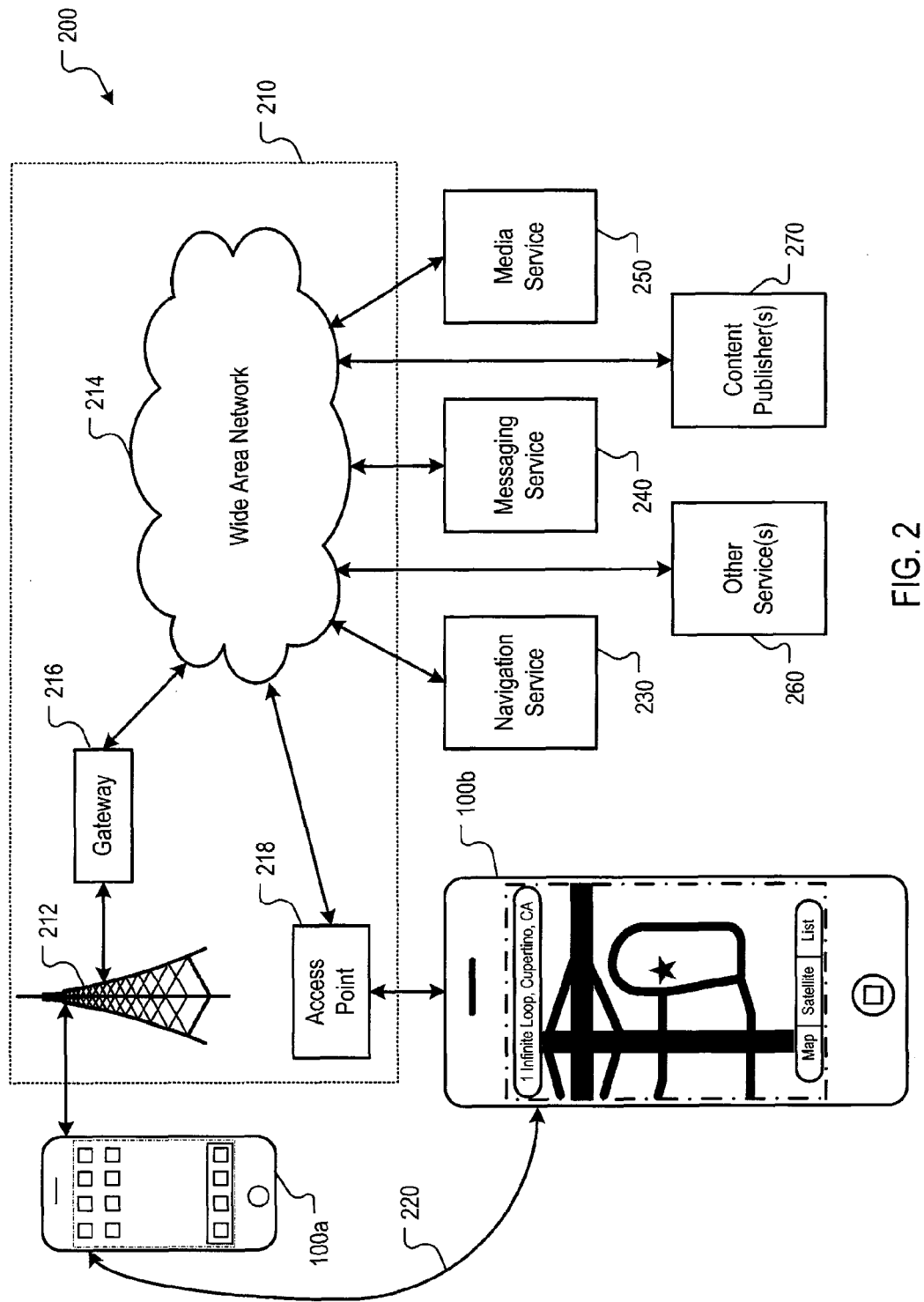
FIG. 2 is a block diagram of an example network operating environment for the mobile device of FIG. 1.

FIG. 2 is a block diagram of an example network operating environment 200 for the mobile device 100 of FIG. 1. The mobile device 100 of FIG. 1 can, for example, communicate over one or more wired and/or wireless networks 210 in data communication. For example, a wireless network 212, e.g., a cellular network, can communicate with a wide area network (WAN) 214, such as the Internet, by use of a gateway 216. Likewise, an access point 218, such as an 802.11g wireless access point device, can provide communication access to the wide area network 214. In some implementations, both voice and data communications can be established over the wireless network 212 and the access point 218. For example, the mobile device 100a can place and receive phone calls (e.g., using VoIP protocols), send and receive e-mail messages (e.g., using POP3 protocol), and retrieve electronic documents and/or streams, such as web pages, photographs, and videos, over the wireless network 212, gateway 216, and wide area network 214 (e.g., using TCP/IP or UDP protocols). Likewise, the mobile device 100b can place and receive phone calls, send and receive e-mail messages, and retrieve electronic documents over the access point 218 and the wide area network 214. In some implementations, the mobile device 100 can be physically connected to the access point 218 using one or more cables and the access point 218 can be a personal computer. In this configuration, the mobile device 100 can be referred to as a "tethered" device.

The mobile devices 100a and 100b can also establish communications by other means. For example, the wireless device 100a can communicate with other wireless devices, e.g., other wireless devices 100, cell phones, etc., over the wireless network 212. Likewise, the mobile devices 100a and 100b can establish peer-to-peer communications 220, e.g., a personal area network, by use of one or more communication subsystems, such as the Bluetooth™ communication device 188 shown in FIG. 1. Other communication protocols and topologies can also be implemented.

The mobile device 100 can, for example, communicate with one or more services 230, 240, 250, and 260 and/or one or more content publishers 270 over the one or more wired and/or wireless networks 210. For example, a navigation service 230 can provide navigation information, e.g., map information, location information, route information, and other information, to the mobile device 100. In the example shown, a user of the mobile device 100b has invoked a map functionality, e.g., by pressing the maps object 144 on the top-level graphical user interface shown in FIG. 1, and has requested and received a map for the location "1 Infinite Loop, Cupertino, Calif."

A messaging service 240 can, for example, provide e-mail and/or other messaging services. A media service 250 can, for example, provide access to media files, such as song files, movie files, video clips, and other media data. One or more other services 260 can also be utilized by the mobile device 100.

The mobile device 100 can also access other data and content over the one or more wired and/or wireless networks 210. For example, content publishers 270, such as news sites, RSS feeds, web sites, blogs, social networking sites, developer networks, etc., can be accessed by the mobile device 100. Such access can be provided by invocation of a web browsing function or application (e.g., a browser) in response to a user touching the Web object 114.

Example Mobile Device Architecture

Figure 3:
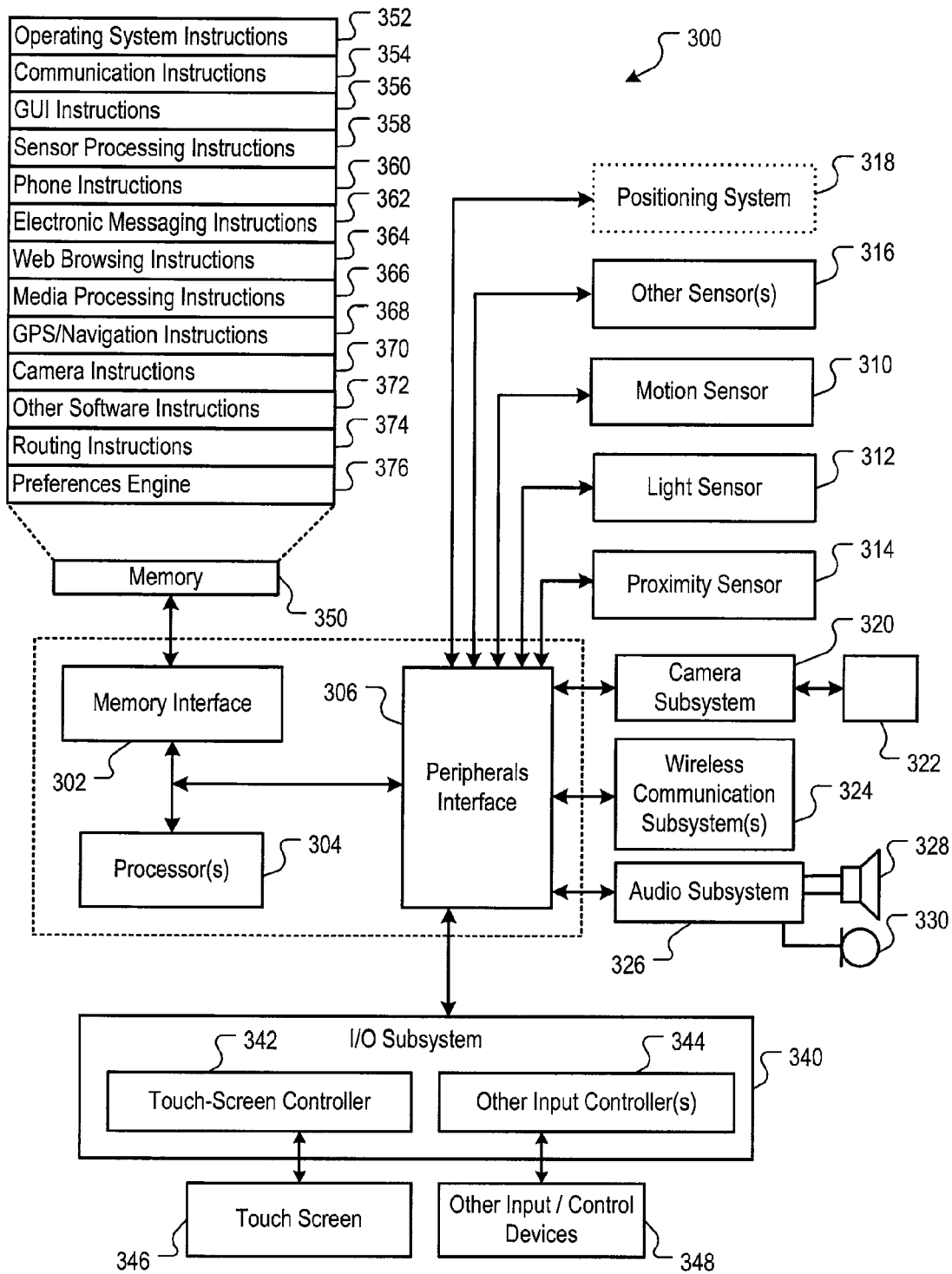
FIG. 3 is a block diagram of an example implementation of the mobile device of FIG. 1.

FIG. 3 is a block diagram 300 of an example implementation of the mobile device 100 of FIG. 1. The mobile device 100 can include a memory interface 302, one or more data processors, image processors and/or central processing units 304, and a peripherals interface 306. The memory interface 302, the one or more processors 304 and/or the peripherals interface 306 can be separate components or can be integrated in one or more integrated circuits. The various components in the mobile device 100 can be coupled by one or more communication buses or signal lines.

Sensors, devices and subsystems can be coupled to the peripherals interface 306 to facilitate multiple functionalities. For example, a motion sensor 310, a light sensor 312, and a proximity sensor 314 can be coupled to the peripherals interface 306 to facilitate the orientation, lighting and proximity functions described with respect to FIG. 1. Other sensors 316 can also be connected to the peripherals interface 306, such as a positioning system (e.g., GPS receiver), a temperature sensor, a biometric sensor, or other sensing device, to facilitate related functionalities.

In some implementations, the mobile device can receive positioning information from a positioning system 318. The positioning system 318, in various implementations, can be located on the mobile device, or can be coupled to the mobile device (e.g., using a wired connection or a wireless connection). In some implementations, the positioning system 318 can include a global positioning system (GPS) receiver and a positioning engine operable to derive positioning information from received GPS satellite signals. In other implementations, the positioning system 318 can include a compass and an accelerometer, as well as a positioning engine operable to derive positioning information based on dead reckoning techniques. In still further implementations, the positioning system 318 can use wireless signals (e.g., cellular signals, IEEE 802.11 signals, etc) to determine location information associated with the mobile device, such as those provided by Skyhook Wireless, Inc. of Boston, Mass. Hybrid positioning systems using a combination of satellite and television signals, such as those provided by Rosum Corporation of Mountain View, Calif., can also be used. Other positioning systems are possible.

A camera subsystem 320 and an optical sensor 322, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 324, which can include radio frequency receivers and transmitters and/or optical (e.g., infrared) receivers and transmitters. The specific design and implementation of the communication subsystem 324 can depend on the communication network(s) over which the mobile device 100 is intended to operate. For example, a mobile device 100 may include communication subsystems 324 designed to operate over a GSM network, a GPRS network, an EDGE network, a Wi-Fi or WiMax network, and a Bluetooth™ network. In particular, the wireless communication subsystems 324 may include hosting protocols such that the device 100 may be configured as a base station for other wireless devices.

An audio subsystem 326 can be coupled to a speaker 328 and a microphone 330 to facilitate voice-enabled functions, such as voice recognition, voice replication, digital recording, and telephony functions.

The I/O subsystem 340 can include a touch screen controller 342 and/or other input controller(s) 344. The touch-screen controller 342 can be coupled to a touch screen 346. The touch screen 346 and touch screen controller 342 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen 346.

The other input controller(s) 344 can be coupled to other input/control devices 348, such as one or more buttons, rocker switches, thumb-wheel, infrared port, USB port, and/or a pointer device such as a stylus. The one or more buttons (not shown) can include an up/down button for volume control of the speaker 328 and/or the microphone 330.

In one implementation, a pressing of the button for a first duration may disengage a lock of the touch screen 346; and a pressing of the button for a second duration that is longer than the first duration may turn power to the mobile device 100 on or off. The user may be able to customize a functionality of one or more of the buttons. The touch screen 346 can, for example, also be used to implement virtual or soft buttons and/or a keyboard.

In some implementations, the mobile device 100 can present recorded audio and/or video files, such as MP3, AAC, and MPEG files. In some implementations, the mobile device 100 can include the functionality of an MP3 player, such as an iPod™. The mobile device 100 may, therefore, include a 36-pin connector that is compatible with the iPod. Other input/output and control devices can also be used.

The memory interface 302 can be coupled to memory 350. The memory 350 can include high-speed random access memory and/or non-volatile memory, such as one or more magnetic disk storage devices, one or more optical storage devices, and/or flash memory (e.g., NAND, NOR). The memory 350 can store an operating system 352, such as Darwin, RTXC, LINUX, UNIX, OS X, WINDOWS, or an embedded operating system such as VxWorks. The operating system 352 may include instructions for handling basic system services and for performing hardware dependent tasks. In some implementations, the operating system 352 can be a kernel (e.g., UNIX kernel).

The memory 350 may also store communication instructions 354 to facilitate communicating with one or more additional devices, one or more computers and/or one or more servers. The memory 350 may include graphical user interface instructions 356 to facilitate graphic user interface processing; sensor processing instructions 358 to facilitate sensor-related processing and functions; phone instructions 360 to facilitate phone-related processes and functions; electronic messaging instructions 362 to facilitate electronic-messaging related processes and functions; web browsing instructions 364 to facilitate web browsing-related processes and functions; media processing instructions 366 to facilitate media processing-related processes and functions; GPS/Navigation instructions 368 to facilitate GPS and navigation-related processes and instructions; camera instructions 370 to facilitate camera-related processes and functions; and/or other software instructions 372 to facilitate other processes and functions.

In some implementations, the mobile device can also include routing instructions 374. The routing instructions 374 can be used to provide navigation guidance to a user of the mobile device. In such implementations, the routing instructions 374 can provide intelligent routing based on disfavored routes/locations, traffic, user preferences, and/or history.

Each of the above identified instructions and applications can correspond to a set of instructions for performing one or more functions described above. These instructions need not be implemented as separate software programs, procedures or modules. The memory 350 can include additional instructions or fewer instructions. Furthermore, various functions of the mobile device 100 may be implemented in hardware and/or in software, including in one or more signal processing and/or application specific integrated circuits.

Figure 4A:
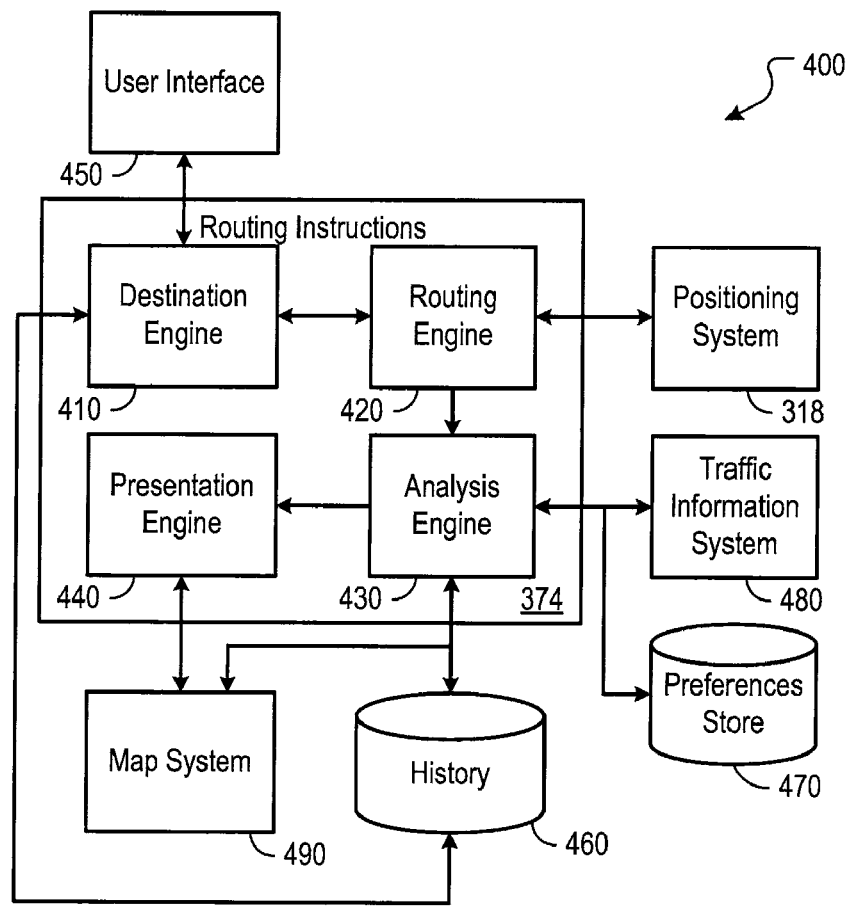
FIG. 4A is a block diagram illustrating an example implementation of routing instructions.

FIG. 4A is a block diagram illustrating an example implementation of a routing system (e.g., embodied in routing instructions stored in a memory). The system 400 can, for example receive multiple preferences including disfavored route progressions and/or locations from a user of a mobile device and arbitrate between competing preferences to provide the user with a route based on the preferences provided by the user.

In some implementations, the routing instructions, when executed, can implement a destination engine 410, a routing engine 420, an analysis engine 430 and a presentation engine 440. In an implementation, the destination engine 410 can receive destination information from a user interface 450. In various implementations, the user interface can include a graphical user interface such as could be provided by the GUI instructions and touch screen of FIG. 3.

In other implementations, the destination engine 410 can derive destination information based on historical data retrieved, for example, from a historical data store 460. The destination engine 410 can parse the historical data to derive navigation habits. For example, a user might drive to work every day. Thus, the destination engine 410 can determine that there is a probability that a destination associated with the user is a workplace. In other implementations, the destination engine 410 can use other algorithms to derive a destination, such as a Markov chain based algorithm. In various examples, the derived destination can include multiple destinations. In such examples, the destinations can include one or more waypoints along with a final destination. In other examples, the derived destination can also take into account a parking situation associated with a destination. Thus, if a user is headed for a stadium for a sporting event, the destination engine 410 can determine that while the stadium is the ultimate destination, the user might be directed to a parking lot as a waypoint to park his/her car before going to the stadium.

In some implementations, the destination engine 410 utilizes date information, time information, calendar information, history information, preference information, etc. to derive destination information. Date information can include, for example, the day of the week, holiday information, etc. For example, a user might have a history of navigating to/from work on Monday through Friday, navigating to/from a grocery store on Sundays, navigating to a parent's house on Mother's Day or Father's Day, etc.

In some implementations, the destination engine 410 can also use the time information such as, e.g., the time of day to derive a destination. For example, on Monday morning, it is likely that a user is navigating to work, on Wednesday night it is likely that the user is navigating to a softball field for a regularly scheduled game, etc.

In some implementations, the destination engine 410 can use calendar information such as appointments, tasks, etc. to derive destination information. For example, a user might have a calendar entry indicating a court date on Aug. 23, 2007 at 9:00 AM, and thus it is likely that on Aug. 23, 2007 at 8:30 am, the user is navigating to a courthouse. In additional implementations, the device can pull calendar information from a variety of sources. For example, a user might keep a business calendar and a personal calendar on separate systems. The device can pull information from both systems to derive a destination. In other examples, a husband and wife might each have separate calendars and the device can derive destination information based upon both of the calendars. In examples where the calendar information conflicts, the device can determine which calendar appointment to use, for example, based upon the current user of the device. In further examples, the calendar information can be pulled from the local device itself, a favorite sports team calendar, a shared calendar, etc.

In some implementations, the destination engine 410 can use history information to recognize patterns, and can use preference information to determine which of a plurality of destinations the user intends (e.g., a user might indicate a preference for destination information derived from calendar information over destination information derived from date information). In some implementations, the destination engine 410 can automatically recognize patterns without user input. In other implementations, the destination engine 410 can automatically recognize navigation patterns and allow users to confirm or reject a destination through a user interface.

In some implementations, the routing engine 420 can derive one or more routes based on current location information and destination information. The one or more routes can be derived using existing routing technology, e.g. map overlays. Current location information of the mobile device can be obtained, for example, using a positioning system 318. In various implementations, the positioning system 318 can be provided by a separate device coupled to the mobile device (e.g., mobile device 100 of FIG. 1). In other implementations, the positioning system 318 can be provided internal to the mobile device.

In one implementation, the positioning system 318 can be a global positioning system (GPS) device. In other implementations, the positioning system 318 can be provided by an accelerometer and a compass using dead reckoning techniques. In such implementations, the user can occasionally reset the positioning system by marking the devices presence at a known location (e.g., landmark, intersection, etc.). In still further implementations, the positioning system 318 can be provided by using wireless signal strength and one or more locations of known wireless signal sources to provide current location. Wireless signal sources can include access points and/or cellular towers. Other positioning systems can also be used.

The routing engine 420 can communicate one or more derived routes to an analysis engine 430. The analysis engine 430 can analyze the one or more routes received from the routing engine 420. In some implementations, the one or more routes can be analyzed based on user preferences received from a preference data store 470. Based on the complexity of a route, the route can include many route progressions. Route progressions, in some implementations, can include discrete lengths of roads which, when put together, make up a route.

In some implementations, the route progressions included in a route can be analyzed based upon user preferences retrieved from a preference data store 470. User preference data, for example, might include preferences to avoid certain route progressions or location. In other examples, the preference data can indicate a user preference for types of roads, distance, traffic, traffic control devices (e.g., traffic lights, stop signs, rotaries, etc.), navigation time, preferred routes, neighborhoods, highways, restaurants, etc. In some implementations, the analysis engine can use such preferences to select among the one or more routes provided by the routing engine.

In those implementations that analyze route progressions based on user preferences, route information can be retrieved and used to provide input by which to weight and compare routes based on the preferences. In some implementations, route information can include disfavored route progressions or locations or disfavor preferences (e.g., disfavored types of roads, disfavored neighborhoods, disfavor for taking the same route everyday, disfavored parking places (e.g., street parking, certain parking lots, etc.). In further implementations, route information can also include a probability that a route progression will include a certain type of activity (e.g., accidents, heavy traffic) even if the route progression is not currently exhibiting that type of activity. In those implementations that include disfavored route progressions or locations or preferences, the disfavored route progressions or locations or preferences can be avoided.

Figure 4B:
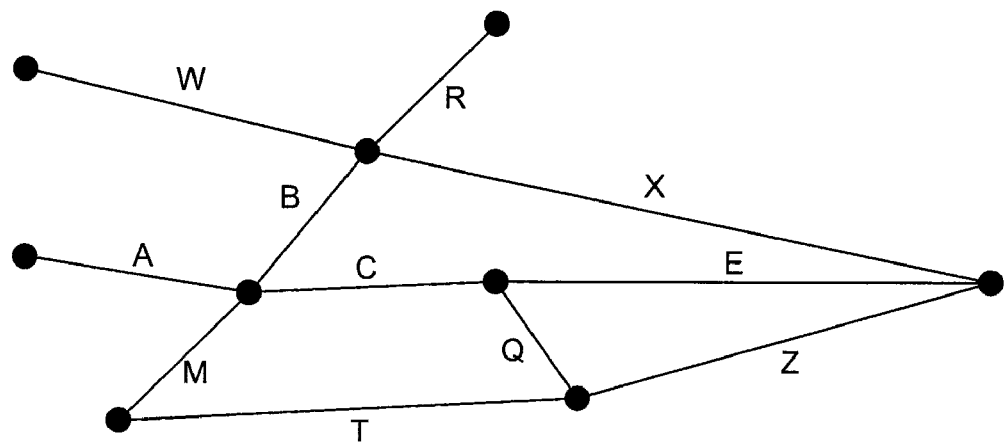
FIG. 4B is a block diagram of a plurality of route progressions.

In some implementations, the routes can be analyzed based upon the traffic information associated with route progressions included in the route. For example, FIG. 4B is a block diagram of a plurality of route progressions. In the example of FIG. 4B, a first route includes progressions A, B and X, a second route includes progressions A, C, Q and Z, and a third route includes progressions A, C and E. However, route progressions M, T, R and W are not included in any of the routes according to a user preference. In those implementations using traffic preferences, the analysis engine 430 can send a request for traffic information associated with only route progressions A, B, C, E, Q, X and Z to the traffic information system 480, while omitting route progressions M, T, R and W because those route progressions are not included in any of the identified routes.

In other implementations using traffic preferences, the traffic information sent to a mobile device (e.g., mobile devices 100 of FIG. 1) can include a universe of traffic information including all available traffic information related to local roads. In such implementations the traffic signal can include many component parts (e.g., one for each available road), and the traffic information for the various roads can be encoded into the signal (e.g., using time division, code division, frequency division, etc.). Thus, the analysis engine 430 can parse (e.g., decode, demultiplex, etc.) the signal to obtain traffic information for a desired route progression. Thus, the mobile device might receive traffic information associated with route progressions A through Z (e.g., A, B, C, E, M, R, T, W, Q, X and Z). Based on the previous example, the analysis engine 430 can parse the traffic information to retrieve traffic related to route progressions A, B, C, E, Q, X and Z.

In some implementations, a user might have indicated a disfavor for route progressions M, Q and X. A routing engine 420, for example, might have determined three routes associated with an origin and destination. A first route might include route progressions A, B and X, a second route might include route progressions A, C, Q and Z, and a third route might include route progressions A, C and E. Based upon the example disfavored routes, the analysis engine 430 can remove the first and second routes from the potential routes, and present only the third route to the user through the presentation engine 440.

In other implementations, the presentation engine can reorder the presentation of all three routes based upon the analysis engine 430 results. Routes including disfavored route progressions can be listed after those routes that do not include disfavored route progressions. In those implementations including a degree of disfavor or weighting associated with the disfavored route progressions or locations or preferences, those routes including the most heavily disfavored route progressions or locations or preferences can be listed after those routes including less disfavored ones. In other implementations, a graphical representation of disfavor can be applied to presented routes. For example, a color spectrum might be applied to the route presentation, whereby green is used to depict most favorable routes, while red is used to depict most disfavored routes.

In some examples, routes might include more than one disfavored route progression or location. In some implementations, the route with the most heavily disfavored route progression or location can be listed after each of the other routes. In other implementations, the analysis engine 430 can derive an aggregation of disfavor associated with the entire route. For example, a first route might include a route progression rated 2 (e.g., on a scale from 1 to 10, "1" being most disfavored and "10" being slightly disfavored), while a second route might include several route progressions rated 3. In such implementations, the analysis engine can place the second route lower in priority because the second route can be inferred to produce more total disfavor based upon the traversal of several disfavored route progressions, while the first route only includes a single disfavored route progression. However, as mentioned above, in some implementations, the second route can be listed ahead of the first route based on the fact that the lowest route progression rating associated with the second route is "3," while the lowest route progression rating associated with the first route is "2."

In further implementations, a distance associated with a route progression can be factored into the determination of whether to give priority to the first route or the second route. For example, if the route progression rated "2" associated with the first route in the above example were the same total distance as an aggregation of the several route progressions rated "3" associated with the second route in the above example, the second route could be given priority over the first route. In such an example, an aggregation of the disfavor associated with the first route would rank the first route lower than an aggregation of the disfavor associated with the second route.

In some implementations, the route information can include historical data. For example, historical data can include information about the average time associated with navigating a route progression. The average time associated with each of the route progressions that are included in a route can combined to provide an estimated total time to navigate the route. The route may then be compared to similarly analyzed routes based on estimated total time to navigate the other routes, which can be used to recommend a route to a user.

In some implementations, the average time to navigate a route progression can be dependent upon the time of day the route progression is being navigated. For example, a section of highway in a large city may be slow at 8:00 am due to rush hour, while the same section of highway might be clear at 10:00 pm. Thus, the historical data can include a time of day for which the average is to be computed. For example, the analysis engine 430 can average the five navigations taken at the closest times of day to a current time. In further implementations, recency of a navigation can be factored in to the estimation of navigation time. For example, the five most recent navigations of a road may be used to calculate an estimated navigation time associated with the route progression. In other implementations, any of these factors can be combined. For example, the time of day can be balanced with the recency of a navigation to produce the five most recent navigations which are closest in time of day to a current time of day.

In further implementations, the route information can include map information received from map system 490. In these implementations, the map information can include distances associated with route progressions, traffic control devices associated with route progressions or portions of route progressions, speed limits associated with route progressions, etc. In some implementations, preferences can be provided which use map information as comparison points between potential routes. For example, if the user indicates a preference for neighborhood driving versus highway driving, the map information can be used to reorder the potential routes based upon such a user preference. The map information can therefore be used to weigh and compare routes based on the preferences.

The analysis engine 430 can provide one or more recommended routes to a presentation engine 440 based on user preferences from the preferences store 470. The presentation engine 440 can communicate with a map system 490 to retrieve map information. In some implementations, the map system 490 can be provided, for example, by a navigation service (e.g., navigation service 230 of FIG. 2). In other implementations, the map system 490 can be provided by a map store residing on the mobile device (e.g., mobile device 100 of FIG. 1). The presentation engine 440 uses map information provided by the map system 490 to overlay the recommended route information based on user preferences. In examples where multiple routes are provided to the user, the presentation engine 440 can receive a route preference from the user and display the preferred route.

In some implementations, the routing engine 420 can continue to analyze a current route to monitor for changing conditions. For example, an accident between the start of navigation of a route and the end of navigation of the route can change the analysis associated with the recommendation of the current route. In such situations, the routing engine 420 and analysis engine 430 can calculate estimated navigation times associated with alternative routes. In some implementations, the routing engine 420 and the analysis engine 430 can automatically communicate a new route to the user through the presentation engine 440. Such automatic rerouting can be provided to the user with notification of the change or without notification of the change to the user. In other implementations, the routing engine 420 and analysis engine 430 can present the estimated navigation times associated with alternative routes to the user through the presentation engine 440. The user can then choose an alternative route based upon the estimated navigation times. The user's choice, in various implementations, can be indicated by selecting a route using an I/O device (e.g., touch screen 346 of FIG. 3), or by navigating one of the alternative routes, among others.

Figure 5:
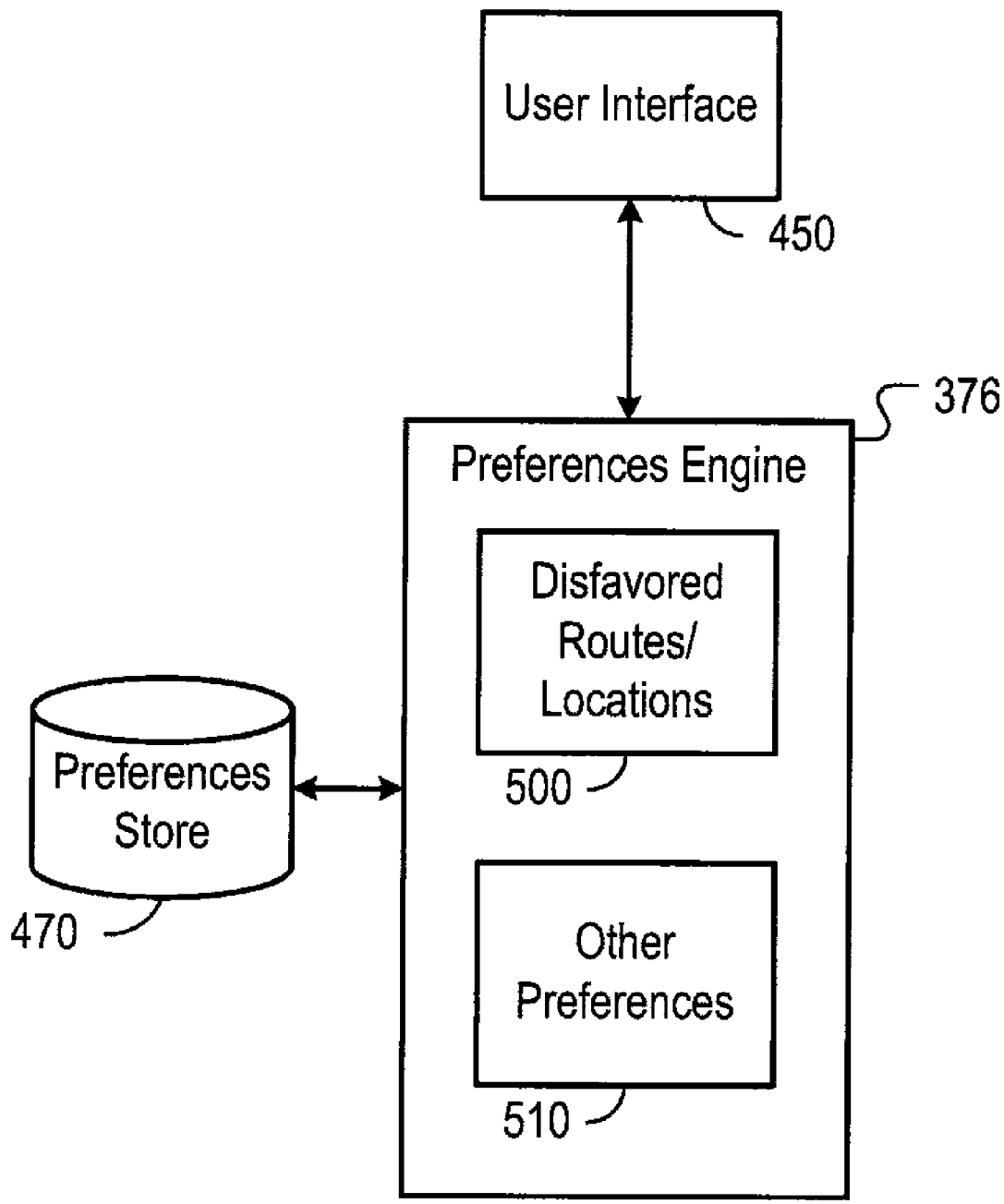
FIG. 5 is a block diagram illustrating an example implementation of a preferences engine.

FIG. 5 is a block diagram illustrating an example implementation of a preferences engine 376. The preferences engine 376 can receive preferences from a user through a user interface 450. The preferences engine 376 can be configured to receive preferences on a variety of different topics. In various implementations, the preferences engine 376 can be configured to receive preferences regarding disfavored routes or locations 500 and other preferences 510.

A disfavored routes or locations preference 500 can include a user's preferences with respect to the user's desire to avoid certain routes or cities. In some implementations, desire to avoid certain routes or locations can be rated on a non-binary scale. In some implementations, the user preference can include a strength associated with the traffic preferences 500. The strength, for example, could be a metric of how strongly a user holds a preference (e.g., on a scale from 1 to 10, how strongly they feel). In some implementations, disfavored routes or locations can include those routes or locations to which the user has negative preferences. For example, a user might be afraid of heights, and therefore wants to avoid route progressions that include high bridges (e.g., the Golden Gate Bridge in San Francisco, Calif.). In other examples, the user might want to avoid urban areas (e.g., large cities).

In some implementations, the user can provide input to the preferences engine 376 specifying those routes or areas that the user wants to avoid. For example, the user can use a user interface to enter locations or streets that the user wants to avoid. In some implementations, the user can provide input to the preferences engine based upon his or her adherence to a presented route. For example, if a user consistently deviates from a presented route at a certain location or route progression, the preferences engine can use this information as input specifying a disfavor with a route progression or location. In other implementations, the preferences engine 376 can analyze historical route information to identify routes or locations avoided by the user. For example, a preferences engine can analyze frequency of use associated with a street or location to determine which streets or locations a user tends to avoid.

In further implementations, a weighting can be applied to a disfavored route progression or location 500 based upon the extent to which a user goes to avoid a route or location. In some implementations, the preferences engine 376 can associate a route progression or location that has never been visited with a neutral rating, inferring that the user might not be familiar with the route progression or location rather than consciously avoiding the route progression or location. In these implementations, the preferences engine 376 can infer that a route progression or location visited only a few times in association with a commonly traveled route is disfavored. Such an inference can be based upon the ratio of the number of times the route has been traveled and not included the route progression. In other implementations, a disfavor preference 500 can be associated with route progressions or locations never visited.

By way of example, if a route from a first location to a second location has been traveled a hundred times, and included a third location only 4 times, an inference can be made that the user disfavors the third location. However, if for example, the route from the first location to the second location had only been traveled ten times, and included the third location four times, the third location is likely not disfavored. In some implementations a weighting associated with the disfavor of a route progression or location 500 can be set based upon the ratio between usage of a routes progressions/locations during a route and the total number of times the route has been traversed (e.g., excluding route progressions/locations that have never been used/visited).

In still further implementations, routing instructions (e.g., routing instructions 374 of FIG. 4A) can identify when a user avoids a route progression presented by the routing instructions and notify the preferences engine 376. In such implementations, the preferences engine 376 can infer from the user's rejection of the route progression that the user does not favor the route progression or location included within the route provided by the routing instructions. In those implementations including a weighting associated with a disfavored route progression or location 500, the preference engine 376 can infer that the avoidance of a route progression or location during presentation of a route is an indication that the route progression or location should be more heavily disfavored in comparison to other derivations of disfavored route progressions or locations 500.

Other preferences 510 can include many different types of preferences including: traffic preferences, road preferences, scenery preferences, traffic control device preferences, services preferences, city preferences, or speed preferences, new route preferences, among many others.

In those implementations including a strength associated with a user preference, the analysis engine (e.g., analysis engine 430 of FIG. 4A) can use the strength to weight the route progressions and use the weighted route progressions to compare routes. For example, the user's desire to avoid traffic can be rated on a scale from 1 to 10, with a rating of "1" corresponding to a highly disfavored route progression or location, and a rating of "10" corresponding to a slightly disfavored route progression or location. In examples where the user indicates a strong disfavor for a route progression or location, the analysis engine can weight the route progressions with higher disfavor more negatively than those with slight disfavor, thereby making it more likely that an analysis engine (e.g., analysis engine 430) will recommend routes having slight disfavor or no disfavor at all. However, in the implementations that include multiple preferences associated with the user, the strengths of other preferences could outweigh other preferences depending on a strength associated with the other preferences.

In some implementations, a group of users can rate a route progression in several categories. The route progression can be assigned a score based on the user ratings. In other implementations, route progressions can be assigned scores based on the individual route progression's popularity among users that have indicated a strong preference for a certain kind of route progression. For example, if a user or group of users indicate a strong preference for scenic roads, and each uses a certain road more frequently in comparison to other roads, the system can assign a high scenery score to the road. In still further implementations, the route progressions can be rated automatically based on measurable statistics. For example, traffic information can identify which route progression is the worst for traffic based upon the average speed associated with the road, or based upon a delta between average speed and speed limit. Similarly, the best route progression for traffic can be identified based on the average speed associated with the road, or based upon a delta between average speed and the speed limit. The worst route progression can be assigned the lowest possible score, and the best route progression can be assigned the highest possible score, while other route progressions are assigned scores which are scaled based upon the high and low scales. Such automatic scoring can be performed where there is an objective measure by which to compare route progressions.

Figure 6:
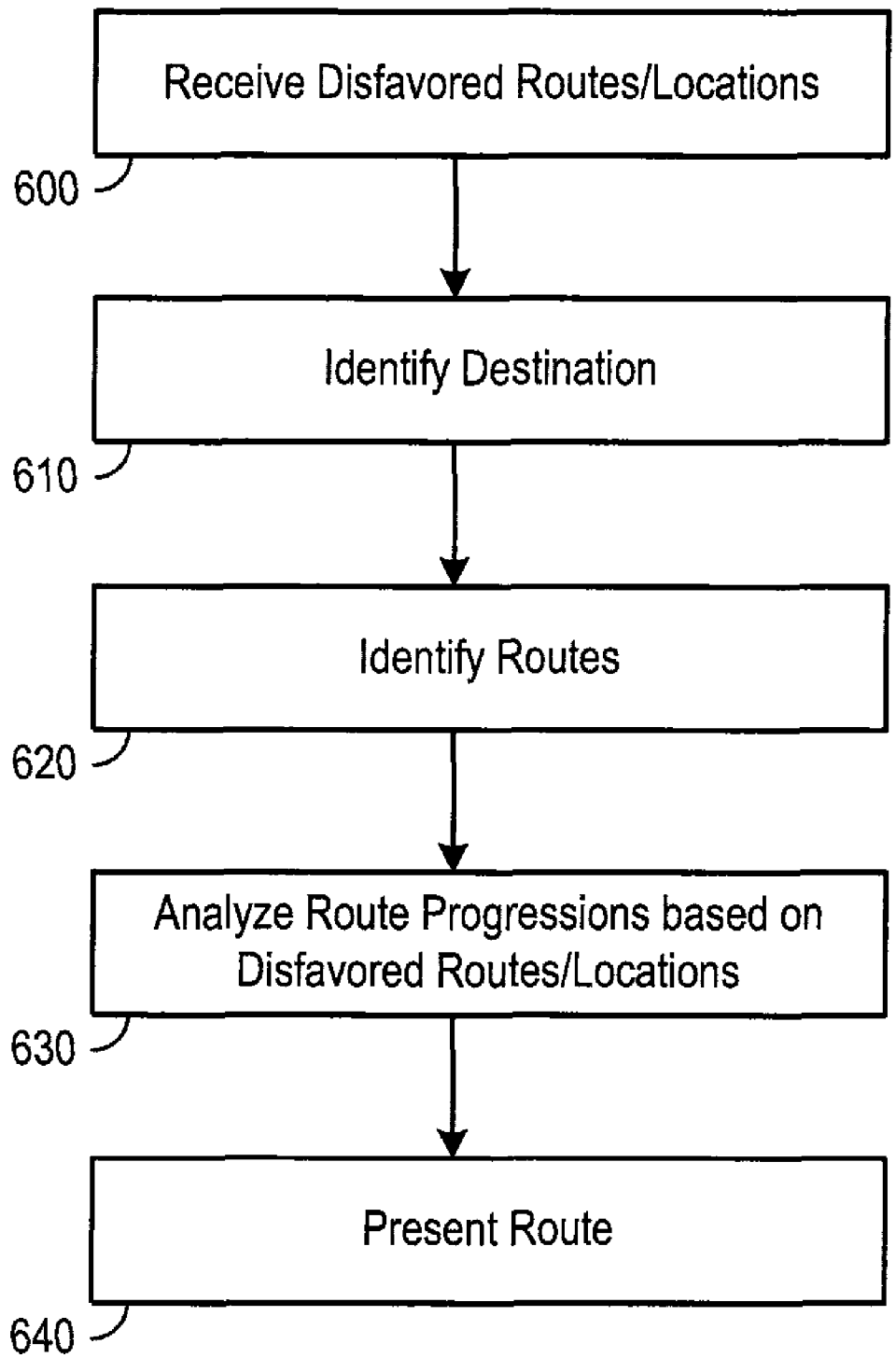
FIG. 6 is a flowchart illustrating an example method for routing.

FIG. 6 is a flowchart illustrating an example method for route guidance. At stage 600 disfavored route progressions or locations or preferences are received. Disfavored route progressions or locations can be received, for example, by a preferences engine (e.g., preferences engine 376 of FIG. 5) in conjunction with a user interface (e.g., user interface 450 of FIG. 5). The disfavored route progressions or locations can include, for example, any route progressions or locations indicated by the user (e.g., through a user interface, frequency of use, avoidance of presented routes, etc.).

At stage 610 the destination is identified. The destination can be identified, for example, by a destination engine (e.g., destination engine 410 of FIG. 4). In some implementations, the destination engine can identify destination information from user input received using a user interface (e.g., user interface 450 of FIG. 4). In such implementations, the user can provide destination information to a mobile device (e.g., mobile device 100 of FIG. 1). In other implementations, the destination engine can identify destination information based on historical data retrieved from a history data store (e.g., history data store 460 of FIG. 4). For example, the destination engine can mine the historical data to automatically derive navigation patterns based on such variables as day, time of day, holiday, and user calendar, among many others. In still further examples, the destination engine can identify destination information based on a combination of user input and historical information. For example, the destination engine can use the user interface to prompt the user to select a destination from among a group of destinations derived based on the historical data.

At stage 620, routes associated with the destination are identified. The routes can be identified, for example, using a routing engine (e.g., routing engine 420). In some implementations, the routing engine can receive position information from a positioning system (e.g., positioning system 318 of FIG. 4). The positioning information can be used as a starting point for the routing engine. In some implementations, the routing engine can use a navigation service (e.g., navigation service 230 of FIG. 2) to derive one or more routes. In other implementations, the routing engine can use GPS/navigation instructions 368 to derive one or more routes.

At stage 630, the route is analyzed based on disfavored route progressions or locations or preferences. The route can be analyzed, for example, using an analysis engine (e.g., analysis engine 430 of FIG. 4). The analysis can retrieve disfavored route progressions or locations from a preferences store (e.g., preferences store 470 of FIG. 4) and use the preferences to weight the route progressions included in the identified routes. The weighted route progressions can be used to rearrange the identified routes based on the user preferences. In some implementations, the analysis can retrieve route information from several different sources (e.g., history data store 460, traffic information system 480, map system 490, of FIG. 4) to use in conjunction with the preference information.

At stage 640, a route is presented. The route can be presented, for example, by a presentation engine (e.g., presentation engine 440) to a user of a mobile device. The presented route can be overlaid onto a map provided by a navigation system (e.g., map system 490 of FIG. 4, or navigation services 230 of FIG. 2). In other implementations, the route can be overlaid on a map provided by a local map data store. In some implementations, the map includes a number of road representations. In further implementations, the road representations, for example, can be overlaid by route information associated with respective route progressions. The presentation of the route can enable a user of the mobile device to navigate from a current position to a destination.

Figure 7:
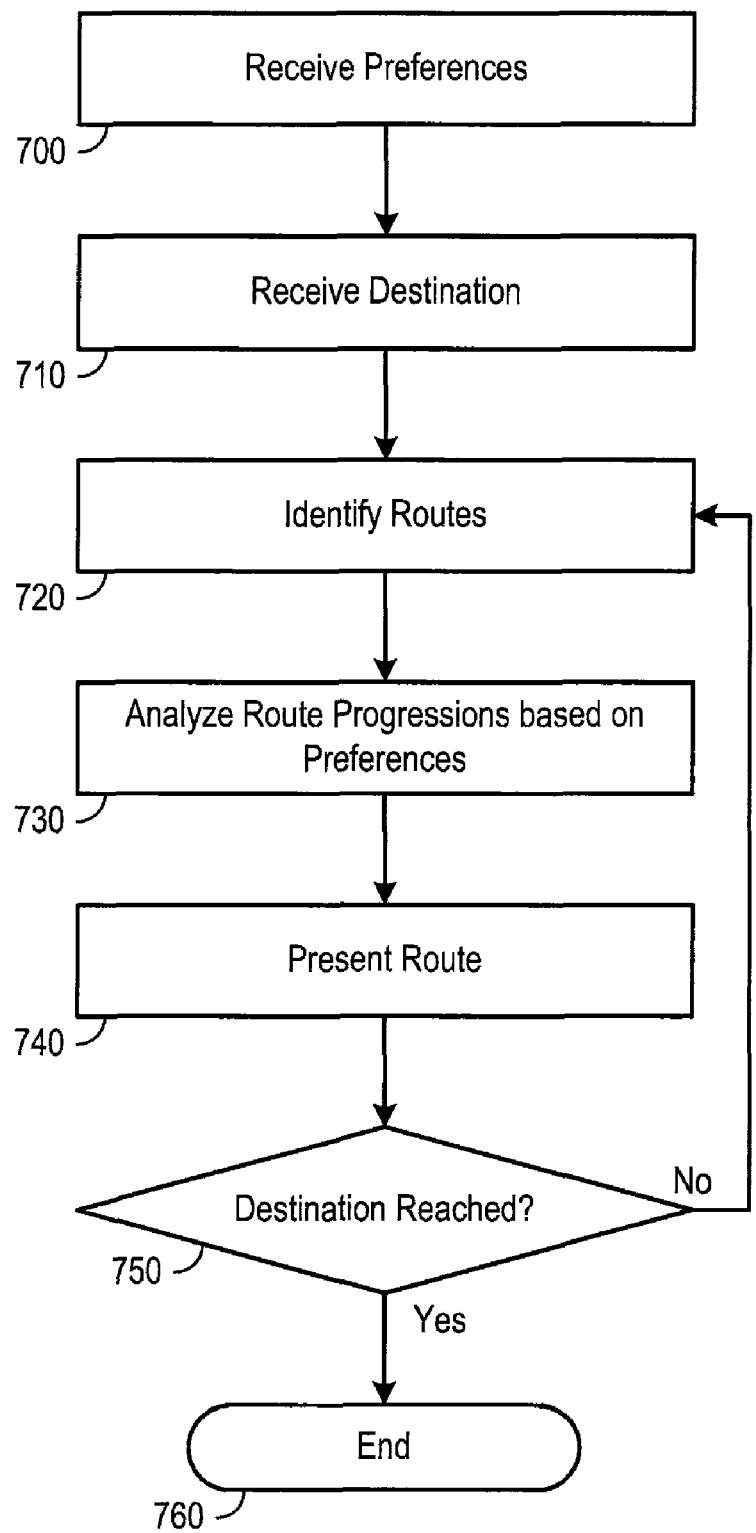
FIG. 7 is a flowchart illustrating another example method for routing.

FIG. 7 is a flowchart illustrating another example method for route guidance. At stage 700 user preferences are received. Preferences can be received, for example, by a preferences engine (e.g., preferences engine 376 of FIG. 5) in conjunction with a user interface (e.g., user interface 450 of FIG. 5). The preferences can include, for example, disfavored route progressions or locations as well as other preferences. In various implementations, other preferences can include traffic preferences, road preferences, scenery preferences, traffic control device preference, services preferences, city preferences, speed preferences, or other preferences. Disfavored route progressions can include, for example, streets that the user does not want to take for some reason (e.g., a road that is in disrepair, etc.). Disfavored locations can include, for example, areas that the user wants to avoid (e.g., industrial areas, areas with high traffic, etc.). In some implementations, disfavored route progressions and/or locations can be disfavored dependent on a time of day. For example, a user might dislike driving on a particular road or through a particular area at night, while not disfavoring the road or area during the daytime. In further implementations, there can be multiple sets of preferences, each set of preferences being associated with a particular user of the device. In such implementations, the device can provide route guidance based upon the particular user who is logged into the system.

In some implementations, the preferences can be received directly from a user. For example, a user can use a user interface to enter his or her disfavored roads and/or areas. In other implementations, the preferences can be derived based upon the user's actions during previous route guidance. For example, if a user consistently refuses to follow a presented route, the device can determine that the user disfavors the route progression and/or location where he/she deviated from the route. In some implementations, the disfavor can be time-based. For example, a user might heavily disfavor a route progression in the morning, but favor the route progression at night. In other implementations, the preferences can be derived based upon historical data. For example, if a user travels from home to work every day for a year, and has used a particular road on that trip only once, a preference engine can derive that the user disfavors that road or area associated with the road. In some implementations, a combination of user input, deviation from route guidance and/or derivation from historical data can be used to determine preferences.

At stage 710 the destination is received/identified. The destination can be received, for example, by a destination engine (e.g., destination engine 410 of FIG. 4). In various implementations, the destination engine can operate based on user input received using a user interface (e.g., user interface 450 of FIG. 4), or can automatically derive a destination based on historical data, and combinations thereof.

At stage 720, routes associated with the destination are identified. The routes can be identified, for example, using a routing engine (e.g., routing engine 420). In some implementations, the routing engine can receive position information from a positioning system (e.g., positioning system 318 of FIG. 4). The positioning information can be used as a starting point for the routing engine, and the routing engine can use a navigation service (e.g., navigation service 230 of FIG. 2) to derive one or more routes. In other implementations, the routing engine can use GPS/navigation instructions 368 to derive one or more routes.

At stage 730, the route is analyzed based on user preferences. The route can be analyzed, for example, using an analysis engine (e.g., analysis engine 430 of FIG. 4) in conjunction with preference information retrieved from a preference store (e.g., preferences store 470 of FIG. 4). In some implementations, the analysis can receive several different routes and prioritize the routes based on the received user preferences, including, for example, disfavored route progressions and/or locations. In some implementations, the analysis engine can reorder the presentation of a plurality of identified routes based on analysis of the route progressions with respect to the user preferences.

At stage 740, a route is presented. The route can be presented, for example, by a presentation engine (e.g., presentation engine 440) to a user of a mobile device. The route can be presented in any of the ways discussed with reference to FIG. 6.

At stage 750, a determination can be made whether a destination has been reached. The determination can be made, for example, by an analysis engine (e.g., analysis engine 430 of FIG. 4) in conjunction with a positioning system (e.g., positioning system 318 of FIG. 4). Where the destination has been reached, the process ends at stage 760.

If the destination has not been reached, the method can return to stage 720, where alternative routes including a plurality of route progressions are retrieved. The route progressions associated with the alternative routes can then be analyzed, and one or more alternative routes are presented to a user based on the analysis (e.g., an accident, traffic build-up, traffic clearing up, time of day dependencies elapsing, etc.).

Thus, a mobile device (e.g., mobile device 100 of FIG. 1) can reroute the user based on changing road conditions. In some implementations, an alternative route is automatically presented to the user without notification, and replaces the current route. In other implementations, a user can be notified that another route might be preferable, and the estimated navigation times associated with both routes can be compared and the user can decide whether to continue on a current route, or to take an alternative route.

The systems and methods disclosed herein may use data signals conveyed using networks (e.g., local area network, wide area network, internet, etc.), fiber optic medium, carrier waves, wireless networks (e.g., wireless local area networks, wireless metropolitan area networks, cellular networks, etc.), etc. for communication with one or more data processing devices (e.g., mobile devices). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

The invention claimed is:

1. A method comprising:
   identifying one or more preferences comprising one or more disfavored route progressions associated with a user, wherein a route progression includes a discrete length of a road that is part of a route for driving to a destination, and wherein a disfavored route progression includes a section of a route that the user wants to avoid while driving to the destination;
   obtaining information corresponding to a destination associated with the user;
   identifying one or more potential routes comprising a plurality of route progressions based on a current location of the user and the destination;
   for each route included in the one or more potential routes, analyzing the plurality of route progressions associated with the route based on weightings associated with the disfavored route progressions, wherein a weighting for a disfavored route progression indicates an extent to which the user avoids the disfavored route progression while traversing a route that includes the disfavored route progression, the weighting based on a ratio between a number of times the disfavored route progression is traveled during traversing the route that includes the disfavored route progression, and a total number of times the route has been traversed;
   ordering the one or more potential routes based on aggregate weightings of the disfavored route progressions associated with each potential route; and
   presenting the ordered one or more potential routes to the user for driving to the destination.

2. The method of claim 1, wherein a preference comprises traffic preferences and the method comprises:
   retrieving traffic information associated with the plurality of route progressions for each route; and
   analyzing the plurality of route progressions based on the traffic preferences.

3. The method of claim 2, comprising:
   providing an estimated time associated with each of the one or more potential routes presented to the user, the estimated time being based on the traffic information.

4. The method of claim 1, comprising:
   collecting route data associated with the user, the route data comprising information about route progressions traversed by the user;
   analyzing the route data; and
   deriving preferences based upon analyzing the route data.

5. The method of claim 4, comprising deriving disfavored route progressions based upon the derived preferences.

6. The method of claim 4, wherein the route data includes deviations from one or more route progressions included in a route presented to the user, the deviations made by the user while traversing the route.

7. The method of claim 1, wherein ordering the one or more potential routes comprises placing a route with more total weighting lower in priority compared to a route with less total weighting.

8. The method of claim 1, comprising receiving the one or more preferences from the user and storing the preferences in a preference data store.

9. The method of claim 1, comprising:
   detecting when a user has avoided a route progression associated with a particular route while traversing the particular route; and
   identifying the route progression associated with the particular route as a disfavored route progression.

10. A system comprising:
   a preference engine operable to receive one or more disfavored route progressions associated with a user, wherein a route progression includes a discrete length of a road that is part of a route for driving to a destination, and wherein a disfavored route progression includes a section of a route that the user wants to avoid while driving to the destination;
   a destination engine operable to receive information corresponding to a destination associated with the user;
   a routing engine operable to identify one or more potential routes, each route comprising a plurality of route progressions, the identification of the one or more potential routes being based on a current location of the user and the destination;

an analysis engine operable to analyze, for each route included in the one or more potential routes, the plurality of route progressions associated with the route based on weightings associated with the plurality of disfavored route progressions, wherein a weighting for a disfavored route progression indicates an extent to which the user avoids the disfavored route progression while traversing a route that includes the disfavored route progression, the weighting based on a ratio between a number of times the disfavored route progression is traveled during traversing the route that includes the disfavored route progression, and a total number of times the route has been traversed, the analysis engine operable to order the one or more potential routes based on aggregate weightings of the disfavored route progressions associated with each potential route; and a presentation engine operable to present the ordered one or more potential routes to the user for driving to the destination.

11. The system of claim 10, wherein preference engine is further operable to receive traffic preferences and the analysis engine is further operable to retrieve traffic information associated with the plurality of route progressions for each route and to analyze the plurality of route progressions based on the traffic preferences and the disfavored route progressions.

12. The system of claim 11, wherein the analysis engine is operable to derive an estimated time associated with each of the plurality of routes, and the presentation engine is operable to provide to the user the estimated time associated with each of the plurality of routes, the estimated time being based on the traffic information.

13. The system of claim 10, comprising:
a history data store operable to store historical route data associated with the user, the historical route data comprising information about route progressions traversed by the user; and
wherein the preference engine is operable to analyze the historical route data and to derive disfavored route progressions based upon analysis of the historical route data.

14. The system of claim 13, wherein the historical route data includes deviations from one or more route progressions included in a route presented to the user, the deviations made by the user while traversing the route.

15. The system of claim 10, wherein the analysis engine is operable to order the one or more potential routes based on placing a route with more total weighting lower in priority compared to a route with less total weighting.

16. The system of claim 10, wherein the preference engine is operable to receive preferences associated with the user.

17. The system of claim 10, wherein the presentation engine is operable to detect when a user has avoided a route progression associated with a particular route while traversing the particular route; and
wherein the preference engine is operable to flag the route progression associated with the particular route as a disfavored route progression.

18. The system of claim 17, wherein the routing engine is operable to identify one or more alternative routes responsive to the user avoiding the route progression associated with the particular route, and the analysis engine is operable to reorder the alternative routes based upon disfavored route progressions associated with each of the alternative routes, and the presentation engine is operable to present a preferred order of alternative routes to the user.

19. The system of claim 18, wherein the user can select one of the alternative routes by beginning navigation of the route.

20. A non-transitory computer-readable medium including one or more sequences of instructions which, when executed by one or more processors, causes the processor to perform operations comprising:
collecting historical navigation data based on a plurality of navigations associated with a user;
deriving one or more disfavored route progressions based on the historical navigation data, wherein a route progression includes a discrete length of a road that is part of a route for driving to a destination, and wherein a disfavored route progression includes a section of a route that the user wants to avoid while driving to the destination;
obtaining information corresponding to a destination associated with the user;
identifying one or more potential routes comprising a plurality of route progressions based on a current location of the user and the destination;
for each route included in the one or more potential routes, analyzing the plurality of route progressions associated with the route based on weightings associated with the disfavored route progressions, wherein a weighting for a disfavored route progression indicates an extent to which the user avoids the disfavored route progression while traversing a route that includes the disfavored route progression, the weighting based on a ratio between a number of times the disfavored route progression is traveled during traversing the route that includes the disfavored route progression, and a total number of times the route has been traversed;
ordering the one or more potential routes based on aggregate weightings of the disfavored route progressions associated with each potential route; and
presenting the ordered one or more potential routes to the user for driving to the destination.

21. A computer-implemented method comprising:
collecting historical navigation data based on a plurality of navigations associated with a user;
deriving one or more disfavored route progressions based on the historical navigation data, wherein a route progression includes a discrete length of a road that is part of a route for driving to a destination, and wherein a disfavored route progression includes a section of a route that the user wants to avoid while driving to the destination;
obtaining information corresponding to a destination associated with the user;
identifying one or more potential routes comprising a plurality of route progressions based on a current location of the user and the destination;
for each route included in the one or more potential routes, analyzing the plurality of route progressions associated with the route based on weightings associated with the disfavored route progressions, wherein a weighting for a disfavored route progression indicates an extent to which the user avoids the disfavored route progression while traversing a route that includes the disfavored route progression, the weighting based on a ratio between a number of times the disfavored route progression is traveled during traversing the route that includes the disfavored route progression, and a total number of times the route has been traversed;

ordering the one or more potential routes based on aggregate weightings of the disfavored route progressions associated with each potential route; and presenting the ordered one or more potential routes to the user for driving to the destination.

* * * * *